(12) United States Patent
Zhang et al.

(10) Patent No.: US 10,459,196 B2
(45) Date of Patent: Oct. 29, 2019

(54) OPTICAL IMAGING LENS

(71) Applicant: GENIUS ELECTRONIC OPTICAL (XIAMEN) CO., LTD., Xiamen (CN)

(72) Inventors: Jiayuan Zhang, Xiamen (CN); Xinming Liu, Xiamen (CN); Qi Liu, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 90 days.

(21) Appl. No.: 15/872,070

(22) Filed: Jan. 16, 2018

(65) Prior Publication Data

US 2019/0154972 A1  May 23, 2019

(30) Foreign Application Priority Data

Nov. 17, 2017 (CN) .......................... 2017 1 1144494

(51) Int. Cl.
| | | |
|---|---|---|
| *G02B 9/64* | (2006.01) | |
| *G02B 13/00* | (2006.01) | |
| *G02B 27/00* | (2006.01) | |

(52) U.S. Cl.
CPC ............ *G02B 9/64* (2013.01); *G02B 13/0045* (2013.01)

(58) Field of Classification Search
CPC ... G02B 13/0045; G02B 9/64; G02B 27/0025
See application file for complete search history.

*Primary Examiner* — Jack Dinh
(74) *Attorney, Agent, or Firm* — Baker & McKenzie LLP

(57) ABSTRACT

Present embodiments provide for an optical imaging lens. The optical imaging lens includes seven lens elements positioned in an order from an object side to an image side. Through designing concave and/or convex surfaces of the seven lens elements, the improved optical imaging lens may provide better imaging quality and optical characteristics while the total length of the optical imaging lens may be shortened.

20 Claims, 28 Drawing Sheets

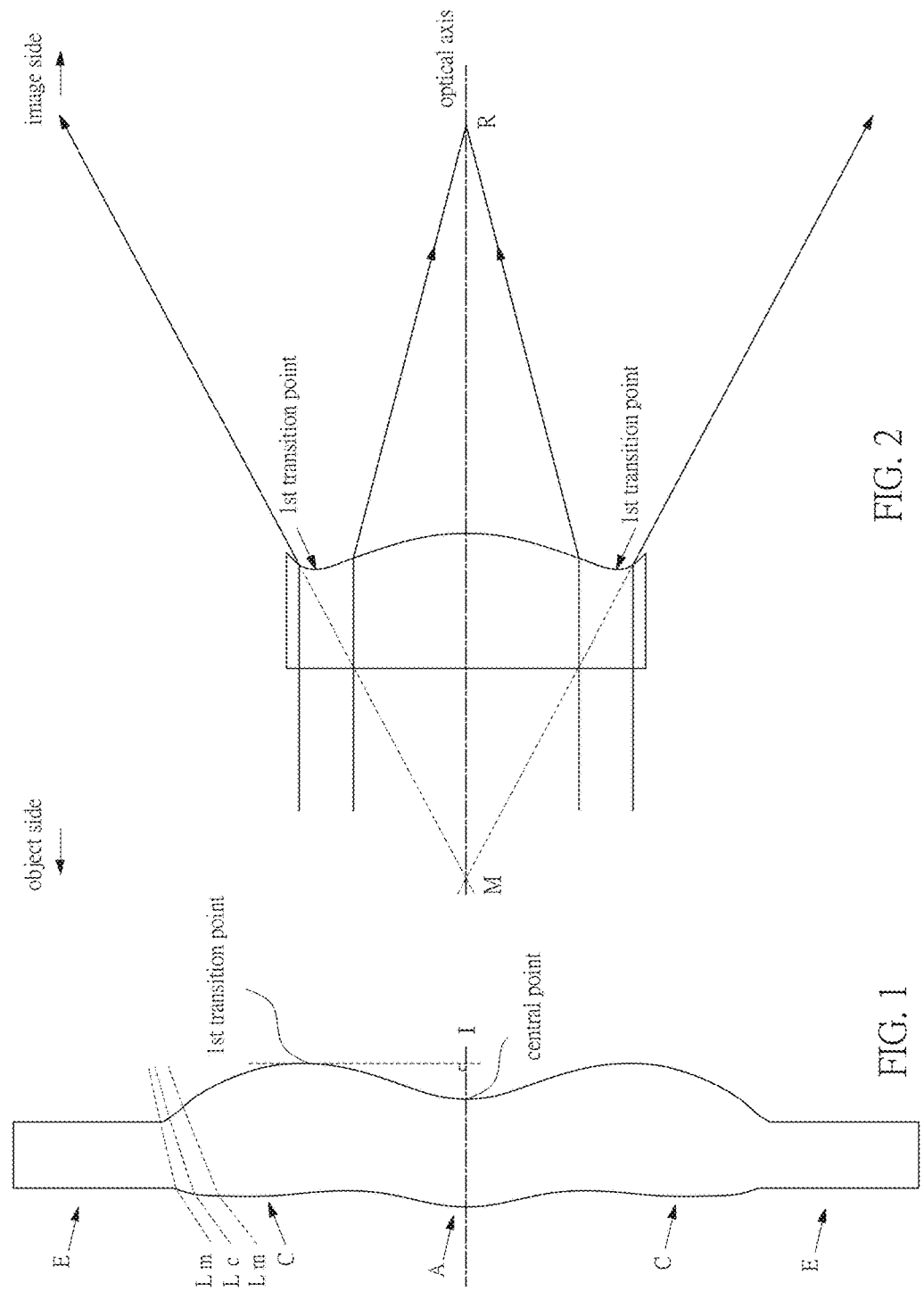

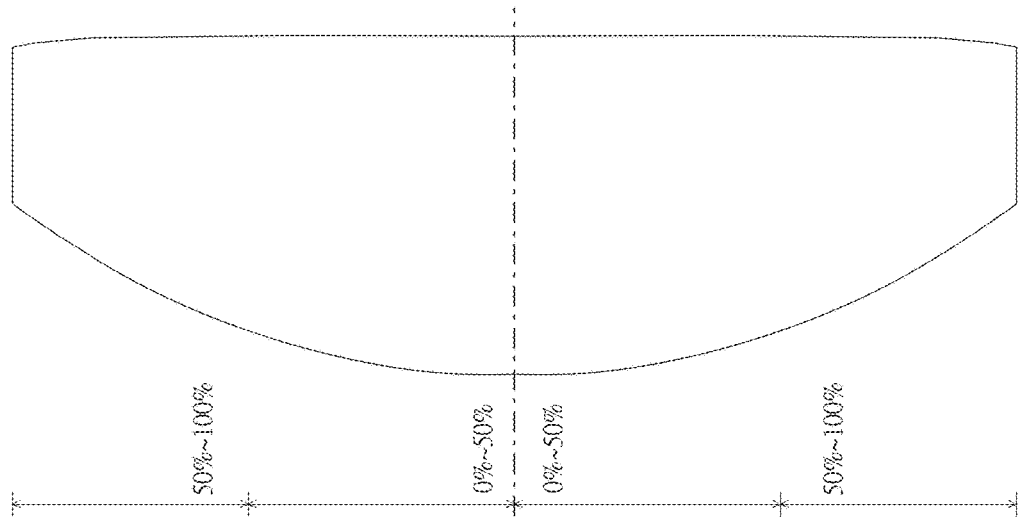
FIG. 5
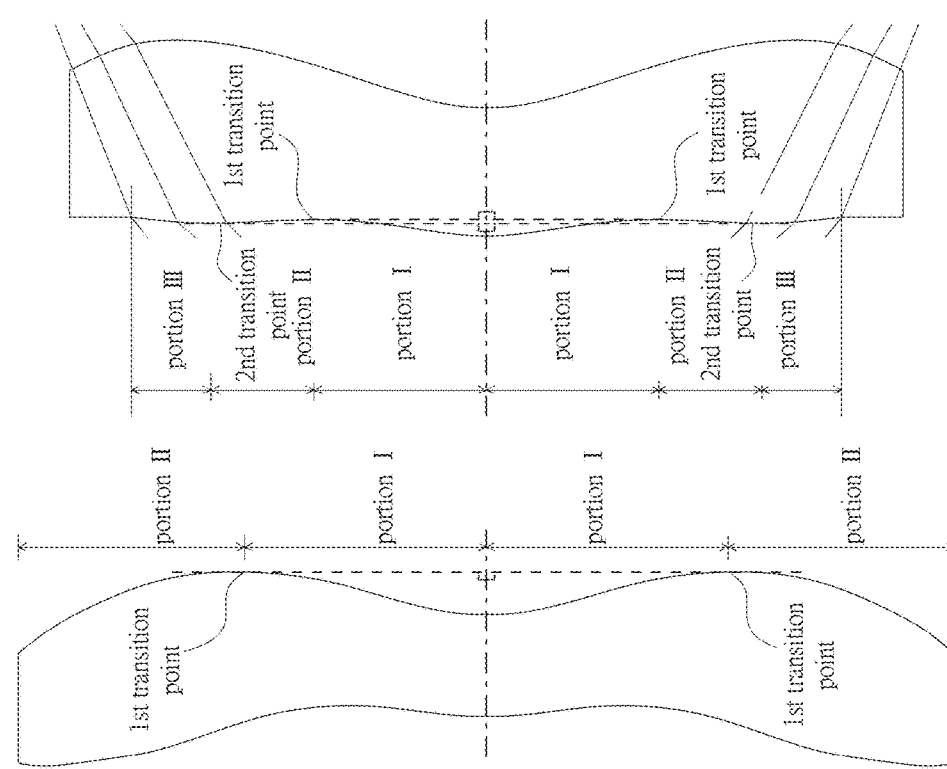
FIG. 4
FIG. 3

| Effective focal length (EFL) = 4.788 mm, HFOV (Half field of view) = 37.172deg., TTL = 6.183 mm, Image height= 4.18 mm, Fno = 1.698 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 100 | Aperture stop | INFINITY | -0.446 | | | | |
| 111 | 1st lens element | 2.247 | 0.765 | 1.545 | 55.987 | 5.729 | Plastic |
| 112 | | 7.005 | 0.067 | | | | |
| 121 | 2nd lens element | 3.213 | 0.305 | 1.661 | 20.412 | -37.801 | Plastic |
| 122 | | 2.742 | 0.622 | | | | |
| 131 | 3rd lens element | -101.581 | 0.197 | 1.545 | 55.987 | 30.656 | Plastic |
| 132 | | -14.386 | 0.046 | | | | |
| 141 | 4th lens element | 7.678 | 0.573 | 1.661 | 20.412 | -171.097 | Plastic |
| 142 | | 6.980 | 0.437 | | | | |
| 151 | 5th lens element | -2.338 | 0.555 | 1.545 | 55.987 | 5.449 | Plastic |
| 152 | | -1.419 | 0.020 | | | | |
| 161 | 6th lens element | 3.284 | 0.426 | 1.545 | 55.987 | -34.001 | Plastic |
| 162 | | 2.663 | 0.302 | | | | |
| 171 | 7th lens element | -23.642 | 0.553 | 1.545 | 55.987 | -5.494 | Plastic |
| 172 | | 3.466 | 0.400 | | | | |
| 181 | IR cut filter | INFINITY | 0.510 | 1.563 | 51.300 | | |
| 182 | | INFINITY | 0.404 | | | | |
| IM1 | Image plane | INFINITY | | | | | |

FIG.8

| Aspherical parameters | | | | | |
|---|---|---|---|---|---|
| Surface # | K | $a_2$ | $a_4$ | $a_6$ | $a_8$ | $a_{10}$ |
| 111 | -3.119239E-01 | 0.000000E+00 | 4.944464E-03 | 2.035995E-03 | -8.130547E-03 | 9.469431E-03 |
| 112 | -2.356183E+01 | 0.000000E+00 | -5.600174E-02 | 1.665729E-02 | 3.484681E-03 | -1.788380E-03 |
| 121 | 1.606147E+00 | 0.000000E+00 | -9.142698E-02 | 6.076433E-03 | 4.041736E-04 | 3.556888E-02 |
| 122 | 5.873138E-01 | 0.000000E+00 | -2.866805E-02 | -2.704736E-02 | 2.653498E-02 | 9.800464E-03 |
| 131 | -6.365889E+01 | 0.000000E+00 | 7.723659E-02 | -3.677827E-02 | -2.632846E-03 | -2.688640E-02 |
| 132 | -2.289145E+01 | 0.000000E+00 | 1.401142E-01 | -1.634533E-01 | 8.482672E-02 | -2.049529E-02 |
| 141 | 0.000000E+00 | 0.000000E+00 | 5.726839E-03 | -7.637809E-02 | 6.035811E-03 | 5.564246E-02 |
| 142 | -4.480215E+01 | 0.000000E+00 | -6.908828E-03 | 2.435540E-03 | -4.058947E-02 | 4.666799E-02 |
| 151 | -9.307735E-01 | 0.000000E+00 | 6.863981E-02 | -1.800288E-02 | 4.260920E-03 | -8.540432E-03 |
| 152 | -2.356674E+00 | 0.000000E+00 | 1.978875E-02 | -3.407948E-02 | 3.380147E-02 | -2.005238E-02 |
| 161 | -7.564571E+00 | 0.000000E+00 | -3.912414E-02 | -1.342805E-02 | 6.797998E-03 | -3.447200E-03 |
| 162 | -5.738309E+00 | 0.000000E+00 | -5.420354E-02 | 8.288624E-03 | -2.799548E-03 | 7.243165E-04 |
| 171 | 0.000000E+00 | 0.000000E+00 | -3.103892E-02 | -2.418078E-03 | 7.836225E-03 | -3.435079E-03 |
| 172 | -2.768279E+01 | 0.000000E+00 | -1.567552E-02 | 1.333916E-03 | 5.921609E-04 | -2.539159E-04 |
| Surface # | $a_{12}$ | $a_{14}$ | $a_{16}$ | $a_{18}$ | $a_{20}$ | |
| 111 | -6.481022E-03 | 2.054724E-03 | -2.949653E-04 | 0.000000E+00 | 0.000000E+00 | |
| 112 | -3.223309E-03 | 2.082140E-03 | -3.834696E-04 | 0.000000E+00 | 0.000000E+00 | |
| 121 | -3.649467E-02 | 1.499126E-02 | -2.269733E-03 | 0.000000E+00 | 0.000000E+00 | |
| 122 | -1.673678E-02 | 6.891327E-03 | -7.429208E-04 | 0.000000E+00 | 0.000000E+00 | |
| 131 | 4.032235E-02 | -2.298312E-02 | 4.667164E-03 | 0.000000E+00 | 0.000000E+00 | |
| 132 | -1.168723E-02 | 8.023731E-03 | -1.341177E-03 | 0.000000E+00 | 0.000000E+00 | |
| 141 | -5.150132E-02 | 2.018993E-02 | -3.014629E-03 | 0.000000E+00 | 0.000000E+00 | |
| 142 | -2.603285E-02 | 7.355388E-03 | -4.511468E-04 | -2.357419E-04 | 3.924568E-05 | |
| 151 | 5.748577E-03 | -1.294971E-03 | 9.456830E-05 | -1.844738E-06 | -8.371648E-07 | |
| 152 | 6.838050E-03 | -6.503482E-04 | -2.052774E-04 | 4.864729E-05 | -2.594565E-06 | |
| 161 | 1.083286E-03 | -1.815461E-04 | 6.110402E-06 | 1.626675E-06 | -1.049149E-07 | |
| 162 | -1.058301E-04 | 4.076725E-06 | 9.707357E-07 | -1.100457E-07 | 3.257990E-09 | |
| 171 | 7.696828E-04 | -9.939104E-05 | 7.453826E-06 | -3.017813E-07 | 5.103460E-09 | |
| 172 | 4.480783E-05 | -4.521044E-06 | 2.689763E-07 | -8.570200E-09 | 1.080300E-10 | |

FIG.9

| Surface # | | Radius (mm) | Thickness / air gap (mm) | Refractive index | Abbe number | Focal length (mm) | Material |
|---|---|---|---|---|---|---|---|
| | Effective focal length (EFL) = 4.788 mm, HFOV (Half field of view) = 36.582deg., TTL = 6.077 mm, Image height= 4.18 mm, Fno = 1.698 |
| - | Object | INFINITY | INFINITY | | | | |
| 200 | Aperture stop | INFINITY | -0.417 | | | | |
| 211 | 1st lens element | 2.332 | 1.074 | 1.545 | 55.987 | 5.782 | Plastic |
| 212 | | 7.465 | 0.243 | | | | |
| 221 | 2nd lens element | 3.854 | 0.449 | 1.661 | 20.412 | -24.658 | Plastic |
| 222 | | 2.977 | 0.326 | | | | |
| 231 | 3rd lens element | -10.963 | 0.364 | 1.545 | 55.987 | 11.056 | Plastic |
| 232 | | -3.940 | 0.014 | | | | |
| 241 | 4th lens element | 7.453 | 0.282 | 1.661 | 20.412 | -16.100 | Plastic |
| 242 | | 4.333 | 0.424 | | | | |
| 251 | 5th lens element | -2.611 | 0.411 | 1.545 | 55.987 | 6.632 | Plastic |
| 252 | | -1.602 | 0.005 | | | | |
| 261 | 6th lens element | 2.157 | 0.387 | 1.545 | 55.987 | -22.243 | Plastic |
| 262 | | 1.716 | 0.763 | | | | |
| 271 | 7th lens element | -45.317 | 0.133 | 1.545 | 55.987 | -9.806 | Plastic |
| 272 | | 6.081 | 0.200 | | | | |
| 281 | IR cut filter | INFINITY | 0.510 | 1.563 | 51.300 | | |
| 282 | | INFINITY | 0.493 | | | | |
| IM2 | Image plane | INFINITY | | | | | |

FIG.12

| Aspherical parameters | | | | | |
|---|---|---|---|---|---|
| Surface # | K | $a_2$ | $a_4$ | $a_6$ | $a_8$ | $a_{10}$ |
| 211 | -3.119239E-01 | 0.000000E+00 | -1.938637E-03 | 1.979767E-03 | -8.309154E-03 | 9.450057E-03 |
| 212 | -2.356183E+01 | 0.000000E+00 | -5.986552E-02 | 1.401488E-02 | 2.781098E-03 | -1.690487E-03 |
| 221 | 1.606147E+00 | 0.000000E+00 | -9.453493E-02 | 7.039395E-03 | 5.071054E-04 | 3.549977E-02 |
| 222 | 5.873138E-01 | 0.000000E+00 | -3.377283E-02 | -2.827546E-02 | 2.678340E-02 | 9.557435E-03 |
| 231 | -6.365889E+01 | 0.000000E+00 | 7.491853E-02 | -3.362120E-02 | -1.976372E-03 | -2.645878E-02 |
| 232 | -2.289145E+01 | 0.000000E+00 | 1.483081E-01 | -1.592600E-01 | 8.486864E-02 | -2.063760E-02 |
| 241 | 0.000000E+00 | 0.000000E+00 | 9.104492E-03 | -8.305677E-02 | 4.085098E-03 | 5.525209E-02 |
| 242 | -4.480215E+01 | 0.000000E+00 | -2.319857E-02 | -5.117013E-04 | -4.007747E-02 | 4.688291E-02 |
| 251 | -9.307735E-01 | 0.000000E+00 | 4.450138E-02 | -1.600659E-02 | 4.967270E-03 | -8.457697E-03 |
| 252 | -2.356674E+00 | 0.000000E+00 | 1.567852E-02 | -3.362622E-02 | 3.403233E-02 | -2.006065E-02 |
| 261 | -7.564571E+00 | 0.000000E+00 | -2.654416E-02 | -9.369410E-03 | 6.604951E-03 | -3.406444E-03 |
| 262 | -5.738309E+00 | 0.000000E+00 | -2.823885E-02 | 5.114539E-03 | -2.531243E-03 | 7.392992E-04 |
| 271 | 0.000000E+00 | 0.000000E+00 | -3.527901E-02 | -2.275297E-03 | 7.847879E-03 | -3.434502E-03 |
| 272 | -2.768279E+01 | 0.000000E+00 | -2.768654E-02 | 2.463682E-03 | 6.010720E-04 | -2.548657E-04 |
| Surface # | $a_{12}$ | $a_{14}$ | $a_{16}$ | $a_{18}$ | $a_{20}$ | |
| 211 | -6.459392E-03 | 2.095081E-03 | -2.692527E-04 | 0.000000E+00 | 0.000000E+00 | |
| 212 | -3.051336E-03 | 2.150744E-03 | -3.902000E-04 | 0.000000E+00 | 0.000000E+00 | |
| 221 | -3.657219E-02 | 1.496681E-02 | -2.252713E-03 | 0.000000E+00 | 0.000000E+00 | |
| 222 | -1.692859E-02 | 6.789568E-03 | -7.293191E-04 | 0.000000E+00 | 0.000000E+00 | |
| 231 | 4.066583E-02 | -2.278415E-02 | 4.700870E-03 | 0.000000E+00 | 0.000000E+00 | |
| 232 | -1.161004E-02 | 8.128326E-03 | -1.275690E-03 | 0.000000E+00 | 0.000000E+00 | |
| 241 | -5.159975E-02 | 2.019021E-02 | -2.988322E-03 | 0.000000E+00 | 0.000000E+00 | |
| 242 | -2.599449E-02 | 7.357098E-03 | -4.531142E-04 | -2.370649E-04 | 3.864411E-05 | |
| 251 | 5.748977E-03 | -1.298415E-03 | 9.302288E-05 | -2.133014E-06 | -8.638594E-07 | |
| 252 | 6.826525E-03 | -6.527557E-04 | -2.057221E-04 | 4.857192E-05 | -2.624446E-06 | |
| 261 | 1.102527E-03 | -1.785360E-04 | 6.419879E-06 | 1.570526E-06 | -1.338869E-07 | |
| 262 | -1.075052E-04 | 3.718167E-06 | 9.367647E-07 | -1.110424E-07 | 3.619770E-09 | |
| 271 | 7.696878E-04 | -9.939275E-05 | 7.453570E-06 | -3.018009E-07 | 5.103240E-09 | |
| 272 | 4.471609E-05 | -4.522301E-06 | 2.689608E-07 | -8.563610E-09 | 1.090500E-10 | |

FIG.13

| Effective focal length (EFL) = 3.515 mm, HFOV (Half field of view) = 40.561deg., TTL = 6.310 mm, Image height= 3.944 mm, Fno = 1.246 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 300 | Aperture stop | INFINITY | -0.411 | | | | |
| 311 | 1st lens element | 2.393 | 0.752 | 1.545 | 55.987 | 6.714 | Plastic |
| 312 | | 6.120 | 0.089 | | | | |
| 321 | 2nd lens element | 3.262 | 0.161 | 1.661 | 20.412 | -43.820 | Plastic |
| 322 | | 2.877 | 0.565 | | | | |
| 331 | 3rd lens element | -8.873 | 0.342 | 1.545 | 55.987 | 13.397 | Plastic |
| 332 | | -4.065 | 0.061 | | | | |
| 341 | 4th lens element | 11.126 | 0.278 | 1.661 | 20.412 | -12.731 | Plastic |
| 342 | | 4.768 | 0.386 | | | | |
| 351 | 5th lens element | -3.285 | 0.665 | 1.545 | 55.987 | 4.614 | Plastic |
| 352 | | -1.528 | 0.245 | | | | |
| 361 | 6th lens element | 0.703 | 0.158 | 1.545 | 55.987 | 40.767 | Plastic |
| 362 | | 0.669 | 1.667 | | | | |
| 371 | 7th lens element | -4.231 | 0.143 | 1.545 | 55.987 | -7.337 | Plastic |
| 372 | | 76.939 | 0.200 | | | | |
| 381 | IR cut filter | INFINITY | 0.510 | 1.563 | 51.300 | | |
| 382 | | INFINITY | 0.088 | | | | |
| IM3 | Image plane | INFINITY | | | | | |

FIG.16

| Aspherical parameters | | | | | |
|---|---|---|---|---|---|
| Surface # | K | $a_2$ | $a_4$ | $a_6$ | $a_8$ | $a_{10}$ |
| 311 | -3.119239E-01 | 0.000000E+00 | 8.586533E-04 | 2.350616E-03 | -8.332873E-03 | 9.594919E-03 |
| 312 | -2.356183E+01 | 0.000000E+00 | -5.047557E-02 | 1.234577E-02 | 3.182742E-03 | -1.409640E-03 |
| 321 | 1.606147E+00 | 0.000000E+00 | -9.115960E-02 | 7.092457E-03 | 2.569592E-04 | 3.523887E-02 |
| 322 | 5.873138E-01 | 0.000000E+00 | -2.875032E-02 | -2.505417E-02 | 2.450989E-02 | 8.872108E-03 |
| 331 | -6.365889E+01 | 0.000000E+00 | 3.891922E-02 | -2.905923E-02 | -1.607531E-03 | -2.811852E-02 |
| 332 | -2.289145E+01 | 0.000000E+00 | 1.214891E-01 | -1.601176E-01 | 8.640633E-02 | -1.965309E-02 |
| 341 | 0.000000E+00 | 0.000000E+00 | -7.258790E-03 | -8.379629E-02 | 3.324461E-03 | 5.512292E-02 |
| 342 | -4.480215E+01 | 0.000000E+00 | -2.856116E-02 | -2.004703E-03 | -4.059393E-02 | 4.661604E-02 |
| 351 | -9.307735E-01 | 0.000000E+00 | 3.919301E-02 | -1.612125E-02 | 4.988625E-03 | -8.456425E-03 |
| 352 | -2.356674E+00 | 0.000000E+00 | 1.247877E-03 | -3.495964E-02 | 3.352942E-02 | -2.027317E-02 |
| 361 | -7.564571E+00 | 0.000000E+00 | -1.344231E-02 | -9.884676E-03 | 6.650411E-03 | -3.475000E-03 |
| 362 | -5.738309E+00 | 0.000000E+00 | -3.135497E-02 | 4.762046E-03 | -2.579719E-03 | 7.506877E-04 |
| 371 | 0.000000E+00 | 0.000000E+00 | -2.965568E-02 | -1.909884E-03 | 7.844274E-03 | -3.436352E-03 |
| 372 | -2.768279E+01 | 0.000000E+00 | -1.435565E-02 | 1.433212E-03 | 5.821832E-04 | -2.509692E-04 |
| Surface # | $a_{12}$ | $a_{14}$ | $a_{16}$ | $a_{18}$ | $a_{20}$ | |
| 311 | -6.517599E-03 | 2.025350E-03 | -2.633908E-04 | 0.000000E+00 | 0.000000E+00 | |
| 312 | -3.063825E-03 | 2.078317E-03 | -3.988139E-04 | 0.000000E+00 | 0.000000E+00 | |
| 321 | -3.641514E-02 | 1.512524E-02 | -2.306926E-03 | 0.000000E+00 | 0.000000E+00 | |
| 322 | -1.671735E-02 | 6.897571E-03 | -8.452960E-04 | 0.000000E+00 | 0.000000E+00 | |
| 331 | 4.026851E-02 | -2.265804E-02 | 4.526644E-03 | 0.000000E+00 | 0.000000E+00 | |
| 332 | -1.158962E-02 | 8.017542E-03 | -1.419920E-03 | 0.000000E+00 | 0.000000E+00 | |
| 341 | -5.139168E-02 | 2.026737E-02 | -3.021234E-03 | 0.000000E+00 | 0.000000E+00 | |
| 342 | -2.606627E-02 | 7.354028E-03 | -4.474479E-04 | -2.340262E-04 | 3.967482E-05 | |
| 351 | 5.692357E-03 | -1.331108E-03 | 8.548697E-05 | -1.262490E-06 | 1.133942E-06 | |
| 352 | 6.837199E-03 | -6.348339E-04 | -2.006004E-04 | 4.904016E-05 | -2.898991E-06 | |
| 361 | 1.097508E-03 | -1.769728E-04 | 6.616820E-06 | 1.538771E-06 | -1.475988E-07 | |
| 362 | -1.109656E-04 | 3.060012E-06 | 8.950058E-07 | -1.080232E-07 | 4.882550E-09 | |
| 371 | 7.694886E-04 | -9.940887E-05 | 7.452672E-06 | -3.017763E-07 | 5.122710E-09 | |
| 372 | 4.478107E-05 | -4.538616E-06 | 2.678662E-07 | -8.584600E-09 | 1.141600E-10 | |

FIG.17

| Surface # | | Radius (mm) | Thickness / air gap (mm) | Refractive index | Abbe number | Focal length (mm) | Material |
|---|---|---|---|---|---|---|---|
| | Effective focal length (EFL) = 1.836 mm、HFOV (Half field of view) = 40.561deg.、TTL = 6.297 mm、Image height = 3.529 mm、Fno = 0.651 | | | | | | |
| - | Object | INFINITY | INFINITY | | | | |
| 400 | Aperture stop | INFINITY | -0.494 | | | | |
| 411 | 1st lens element | 2.121 | 0.242 | 1.545 | 55.987 | 13.106 | Plastic |
| 412 | | 2.892 | 0.455 | | | | |
| 421 | 2nd lens element | 4.308 | 0.999 | 1.661 | 20.412 | 178.797 | Plastic |
| 422 | | 4.054 | 0.413 | | | | |
| 431 | 3rd lens element | -0.804 | 0.126 | 1.545 | 55.987 | 1.157 | Plastic |
| 432 | | -0.374 | 0.052 | | | | |
| 441 | 4th lens element | 2.626 | 0.051 | 1.661 | 20.412 | -2.066 | Plastic |
| 442 | | 0.897 | 0.375 | | | | |
| 451 | 5th lens element | -10.087 | 0.258 | 1.545 | 55.987 | 10.424 | Plastic |
| 452 | | -3.672 | 0.754 | | | | |
| 461 | 6th lens element | 6.797 | 0.730 | 1.545 | 55.987 | 4.921 | Plastic |
| 462 | | -4.278 | 0.552 | | | | |
| 471 | 7th lens element | -3.164 | 0.047 | 1.545 | 55.987 | -2.670 | Plastic |
| 472 | | 2.720 | 0.300 | | | | |
| 481 | IR cut filter | INFINITY | 0.510 | 1.563 | 51.300 | | |
| 482 | | INFINITY | 0.433 | | | | |
| IM4 | Image plane | INFINITY | | | | | |

FIG.20

| Aspherical parameters | | | | | | |
|---|---|---|---|---|---|---|
| Surface # | K | $a_2$ | $a_4$ | $a_6$ | $a_8$ | $a_{10}$ |
| 411 | -3.119239E-01 | 0.000000E+00 | -1.613554E-02 | 2.027536E-02 | -2.181291E-02 | 1.540514E-02 |
| 412 | -2.356183E+01 | 0.000000E+00 | 6.689129E-02 | -5.386031E-02 | 2.034723E-02 | -9.191558E-05 |
| 421 | 1.606147E+00 | 0.000000E+00 | -2.855016E-02 | -1.978542E-03 | -2.136256E-02 | 3.841780E-02 |
| 422 | 5.873138E-01 | 0.000000E+00 | 1.379984E-02 | -4.530300E-02 | 1.865906E-02 | 7.764164E-03 |
| 431 | -6.365889E+01 | 0.000000E+00 | 1.442521E-01 | -3.051555E-02 | -2.518454E-02 | -2.322570E-04 |
| 432 | -2.289145E+01 | 0.000000E+00 | 2.062339E-01 | -1.738514E-01 | 1.011107E-01 | -2.456600E-02 |
| 441 | 0.000000E+00 | 0.000000E+00 | 1.763483E-03 | -5.711374E-02 | -6.008985E-02 | 1.049655E-01 |
| 442 | -4.480215E+01 | 0.000000E+00 | 1.592240E-01 | -2.096587E-01 | 8.502552E-02 | -3.910782E-03 |
| 451 | -9.307735E-01 | 0.000000E+00 | 2.937078E-02 | -3.215873E-03 | -4.674014E-03 | -5.560330E-03 |
| 452 | -2.356674E+00 | 0.000000E+00 | 3.694648E-02 | -4.495092E-02 | 3.212898E-02 | -1.808819E-02 |
| 461 | -7.564571E+00 | 0.000000E+00 | 4.840818E-02 | -2.788230E-02 | 1.003898E-02 | -4.032007E-03 |
| 462 | -5.738309E+00 | 0.000000E+00 | 1.024266E-01 | -4.521128E-02 | 1.196883E-02 | -2.961902E-03 |
| 471 | 0.000000E+00 | 0.000000E+00 | -1.388072E-02 | -3.276073E-03 | 7.684012E-03 | -3.305695E-03 |
| 472 | -2.768279E+01 | 0.000000E+00 | -2.776585E-02 | 4.613182E-03 | 5.861298E-04 | -3.204134E-04 |
| Surface # | $a_{12}$ | $a_{14}$ | $a_{16}$ | $a_{18}$ | $a_{20}$ | |
| 411 | -6.644928E-03 | 1.521530E-03 | -9.273778E-05 | 0.000000E+00 | 0.000000E+00 | |
| 412 | -4.156961E-03 | 1.951423E-03 | -2.956437E-04 | 0.000000E+00 | 0.000000E+00 | |
| 421 | -3.136598E-02 | 1.252259E-02 | -1.991121E-03 | 0.000000E+00 | 0.000000E+00 | |
| 422 | -1.227742E-02 | 5.169710E-03 | -7.886905E-04 | 0.000000E+00 | 0.000000E+00 | |
| 431 | 2.362105E-02 | -1.523369E-02 | 2.518028E-03 | 0.000000E+00 | 0.000000E+00 | |
| 432 | -6.310802E-03 | 3.861078E-03 | -7.875808E-04 | 0.000000E+00 | 0.000000E+00 | |
| 441 | -6.814245E-02 | 2.081222E-02 | -2.575959E-03 | 0.000000E+00 | 0.000000E+00 | |
| 442 | -1.771510E-02 | 9.044849E-03 | -1.502625E-03 | -2.776808E-04 | 1.095689E-04 | |
| 451 | 4.189630E-03 | -1.862621E-03 | 2.888837E-04 | 1.096223E-04 | -3.023481E-05 | |
| 452 | 5.587191E-03 | -8.584793E-04 | -1.010064E-04 | 4.919628E-05 | -1.853681E-06 | |
| 461 | 1.124330E-03 | -1.609620E-04 | 5.107378E-06 | 1.091097E-06 | -8.239954E-08 | |
| 462 | 4.924525E-04 | -2.287141E-05 | -6.038751E-06 | 9.039706E-07 | -3.474903E-08 | |
| 471 | 7.578019E-04 | -1.002044E-04 | 7.512491E-06 | -2.896433E-07 | 4.283990E-09 | |
| 472 | 5.304135E-05 | -4.839188E-06 | 2.518434E-07 | -6.268340E-09 | 3.032000E-11 | |

FIG.21

| Effective focal length (EFL) = 4.923 mm, HFOV (Half field of view) = 38.827deg., TTL = 6.373 mm, Image height= 4.18 mm, Fno = 1.746 |||||||
|---|---|---|---|---|---|---|---|
| Surface # | | Radius (mm) | Thickness / air gap (mm) | Refractive index | Abbe number | Focal length (mm) | Material |
| -- | Object | INFINITY | INFINITY | | | | |
| 500 | Aperture stop | INFINITY | -0.395 | | | | |
| 511 | 1st lens element | 2.368 | 0.734 | 1.545 | 55.987 | 6.150 | Plastic |
| 512 | | 7.140 | 0.085 | | | | |
| 521 | 2nd lens element | 3.635 | 0.332 | 1.545 | 55.987 | -29.851 | Plastic |
| 522 | | 2.877 | 0.456 | | | | |
| 531 | 3rd lens element | -4526077.870 | 0.375 | 1.545 | 55.987 | 8.931 | Plastic |
| 532 | | -4.879 | 0.076 | | | | |
| 541 | 4th lens element | 11.247 | 0.307 | 1.545 | 55.987 | -12.099 | Plastic |
| 542 | | 4.123 | 0.441 | | | | |
| 551 | 5th lens element | -2.695 | 0.678 | 1.545 | 55.987 | 5.755 | Plastic |
| 552 | | -1.580 | 0.040 | | | | |
| 561 | 6th lens element | 2.305 | 0.445 | 1.545 | 55.987 | -14.400 | Plastic |
| 562 | | 1.661 | 0.801 | | | | |
| 571 | 7th lens element | -18.851 | 0.578 | 1.545 | 55.987 | -7.653 | Plastic |
| 572 | | 5.430 | 0.200 | | | | |
| 581 | IR cut filter | INFINITY | 0.510 | 1.563 | 51.300 | | |
| 582 | | INFINITY | 0.313 | | | | |
| IM5 | Image plane | INFINITY | | | | | |

FIG.24

| Aspherical parameters | | | | | |
|---|---|---|---|---|---|
| Surface # | K | $a_2$ | $a_4$ | $a_6$ | $a_8$ | $a_{10}$ |
| 511 | -3.119239E-01 | 0.000000E+00 | 6.744171E-04 | 2.778005E-03 | -8.335456E-03 | 9.297640E-03 |
| 512 | -2.356183E+01 | 0.000000E+00 | -5.672491E-02 | 1.544725E-02 | 3.201967E-03 | -1.796022E-03 |
| 521 | 1.606147E+00 | 0.000000E+00 | -9.618135E-02 | 8.205827E-03 | 1.095016E-03 | 3.554728E-02 |
| 522 | 5.873138E-01 | 0.000000E+00 | -2.427075E-02 | -3.102546E-02 | 2.559870E-02 | 9.731141E-03 |
| 531 | -6.365889E+01 | 0.000000E+00 | 5.978323E-02 | -3.404115E-02 | -1.879371E-03 | -2.684098E-02 |
| 532 | -2.289145E+01 | 0.000000E+00 | 1.399778E-01 | -1.625521E-01 | 8.439726E-02 | -2.046879E-02 |
| 541 | 0.000000E+00 | 0.000000E+00 | 6.986609E-03 | -8.295925E-02 | 4.011626E-03 | 5.530418E-02 |
| 542 | -4.480215E+01 | 0.000000E+00 | -1.784733E-02 | -1.607514E-03 | -4.036192E-02 | 4.684926E-02 |
| 551 | -9.307735E-01 | 0.000000E+00 | 4.315808E-02 | -1.597263E-02 | 4.963346E-03 | -8.507197E-03 |
| 552 | -2.356674E+00 | 0.000000E+00 | 1.261968E-02 | -3.539804E-02 | 3.382632E-02 | -2.004389E-02 |
| 561 | -7.564571E+00 | 0.000000E+00 | -2.372084E-02 | -9.129164E-03 | 6.615810E-03 | -3.408227E-03 |
| 562 | -5.738309E+00 | 0.000000E+00 | -2.790062E-02 | 5.338472E-03 | -2.543339E-03 | 7.378852E-04 |
| 571 | 0.000000E+00 | 0.000000E+00 | -3.466364E-02 | -2.242182E-03 | 7.849031E-03 | -3.434519E-03 |
| 572 | -2.768279E+01 | 0.000000E+00 | -2.818113E-02 | 2.640543E-03 | 5.997699E-04 | -2.550129E-04 |
| Surface # | $a_{12}$ | $a_{14}$ | $a_{16}$ | $a_{18}$ | $a_{20}$ | |
| 511 | -6.560812E-03 | 2.054172E-03 | -2.786940E-04 | 0.000000E+00 | 0.000000E+00 | |
| 512 | -3.202604E-03 | 2.094272E-03 | -3.808204E-04 | 0.000000E+00 | 0.000000E+00 | |
| 521 | -3.660899E-02 | 1.495211E-02 | -2.241788E-03 | 0.000000E+00 | 0.000000E+00 | |
| 522 | -1.667881E-02 | 6.848299E-03 | -7.964774E-04 | 0.000000E+00 | 0.000000E+00 | |
| 531 | 4.033161E-02 | -2.289627E-02 | 4.717779E-03 | 0.000000E+00 | 0.000000E+00 | |
| 532 | -1.151308E-02 | 8.138216E-03 | -1.298568E-03 | 0.000000E+00 | 0.000000E+00 | |
| 541 | -5.148987E-02 | 2.027718E-02 | -2.931482E-03 | 0.000000E+00 | 0.000000E+00 | |
| 542 | -2.598704E-02 | 7.362843E-03 | -4.509763E-04 | -2.362898E-04 | 3.892696E-05 | |
| 551 | 5.723069E-03 | -1.305410E-03 | 9.239719E-05 | -2.100986E-06 | -6.832128E-07 | |
| 552 | 6.836882E-03 | -6.465219E-04 | -2.043253E-04 | 4.886369E-05 | -2.563827E-06 | |
| 561 | 1.101938E-03 | -1.786531E-04 | 6.399366E-06 | 1.565430E-06 | -1.347373E-07 | |
| 562 | -1.076864E-04 | 3.697211E-06 | 9.347166E-07 | -1.112369E-07 | 3.602580E-09 | |
| 571 | 7.696765E-04 | -9.939432E-05 | 7.453416E-06 | -3.018147E-07 | 5.102160E-09 | |
| 572 | 4.470770E-05 | -4.526566E-06 | 2.687965E-07 | -8.565250E-09 | 1.098100E-10 | |

FIG.25

| Effective focal length (EFL) = 4.464 mm, HFOV (Half field of view) = 38.843deg., TTL = 6.323 mm, Image height= 4.18 mm, Fno = 1.583 ||||||| 
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 600 | Aperture stop | INFINITY | -0.419 | | | | |
| 611 | 1st lens element | 2.307 | 0.867 | 1.545 | 55.987 | 5.862 | Plastic |
| 612 | | 7.155 | 0.088 | | | | |
| 621 | 2nd lens element | 3.530 | 0.329 | 1.661 | 20.412 | -43.143 | Plastic |
| 622 | | 3.027 | 0.415 | | | | |
| 631 | 3rd lens element | -1.917E+09 | 0.499 | 1.545 | 55.987 | 7.781 | Plastic |
| 632 | | -4.251 | 0.028 | | | | |
| 641 | 4th lens element | 11.215 | 0.355 | 1.661 | 20.412 | -10.478 | Plastic |
| 642 | | 4.252 | 0.365 | | | | |
| 651 | 5th lens element | -3.081 | 0.790 | 1.545 | 55.987 | 4.917 | Plastic |
| 652 | | -1.565 | 0.001 | | | | |
| 661 | 6th lens element | 2.845 | 0.479 | 1.545 | 55.987 | -13.307 | Plastic |
| 662 | | 1.923 | 0.416 | | | | |
| 671 | 7th lens element | -301.446 | 0.623 | 1.545 | 55.987 | -6.351 | Plastic |
| 672 | | 3.512 | 0.300 | | | | |
| 681 | IR cut filter | INFINITY | 0.510 | 1.563 | 51.300 | | |
| 682 | | INFINITY | 0.256 | | | | |
| IM6 | Image plane | INFINITY | | | | | |

FIG.28

| Aspherical parameters | | | | | |
|---|---|---|---|---|---|
| Surface # | K | $a_2$ | $a_4$ | $a_6$ | $a_8$ | $a_{10}$ |
| 611 | -2.476721E-01 | 0.000000E+00 | 1.590399E-03 | 2.540423E-03 | -8.224400E-03 | 9.537150E-03 |
| 612 | -2.936984E+01 | 0.000000E+00 | -5.766578E-02 | 1.598548E-02 | 3.400164E-03 | -1.773747E-03 |
| 621 | 1.483113E+00 | 0.000000E+00 | -9.371581E-02 | 7.515069E-03 | 5.401810E-04 | 3.539671E-02 |
| 622 | 8.197017E-01 | 0.000000E+00 | -2.692834E-02 | -3.152188E-02 | 2.540749E-02 | 9.795821E-03 |
| 631 | -9.448943E-08 | 0.000000E+00 | 5.738462E-02 | -3.158453E-02 | -1.335960E-03 | -2.664343E-02 |
| 632 | -4.184445E+01 | 0.000000E+00 | 1.338491E-01 | -1.611511E-01 | 8.511295E-02 | -2.024246E-02 |
| 641 | 3.944319E+00 | 0.000000E+00 | 8.893711E-03 | -8.426032E-02 | 2.895943E-03 | 5.519807E-02 |
| 642 | -5.208132E+01 | 0.000000E+00 | -2.107565E-02 | -6.659622E-04 | -4.070946E-02 | 4.674292E-02 |
| 651 | -4.064870E-01 | 0.000000E+00 | 4.270060E-02 | -1.683161E-02 | 5.016044E-03 | -8.453047E-03 |
| 652 | -2.350392E+00 | 0.000000E+00 | 1.102195E-02 | -3.620057E-02 | 3.393038E-02 | -2.002702E-02 |
| 661 | -2.236992E+01 | 0.000000E+00 | -2.600360E-02 | -1.302240E-02 | 6.663696E-03 | -3.337202E-03 |
| 662 | -7.678859E+00 | 0.000000E+00 | -3.350761E-02 | 6.213997E-03 | -2.630448E-03 | 7.207662E-04 |
| 671 | -9.665637E-03 | 0.000000E+00 | -3.451014E-02 | -2.312501E-03 | 7.845361E-03 | -3.435133E-03 |
| 672 | -1.374849E+01 | 0.000000E+00 | -2.425728E-02 | 2.377657E-03 | 5.994064E-04 | -2.550019E-04 |
| Surface # | $a_{12}$ | $a_{14}$ | $a_{16}$ | $a_{18}$ | $a_{20}$ | |
| 611 | -6.490204E-03 | 2.064721E-03 | -2.859567E-04 | 0.000000E+00 | 0.000000E+00 | |
| 612 | -3.189461E-03 | 2.091851E-03 | -3.820060E-04 | 0.000000E+00 | 0.000000E+00 | |
| 621 | -3.655104E-02 | 1.500971E-02 | -2.261634E-03 | 0.000000E+00 | 0.000000E+00 | |
| 622 | -1.671813E-02 | 6.869075E-03 | -7.313747E-04 | 0.000000E+00 | 0.000000E+00 | |
| 631 | 4.035460E-02 | -2.282080E-02 | 4.692780E-03 | 0.000000E+00 | 0.000000E+00 | |
| 632 | -1.156874E-02 | 8.106489E-03 | -1.313738E-03 | 0.000000E+00 | 0.000000E+00 | |
| 641 | -5.145941E-02 | 2.027111E-02 | -2.949688E-03 | 0.000000E+00 | 0.000000E+00 | |
| 642 | -2.600056E-02 | 7.352583E-03 | -4.500643E-04 | -2.356358E-04 | 3.912472E-05 | |
| 651 | 5.753494E-03 | -1.310070E-03 | 8.749363E-05 | -2.725829E-06 | -1.853064E-07 | |
| 652 | 6.840478E-03 | -6.445438E-04 | -2.031452E-04 | 4.874786E-05 | -2.661210E-06 | |
| 661 | 1.102916E-03 | -1.801611E-04 | 6.143788E-06 | 1.502422E-06 | -1.751496E-07 | |
| 662 | -1.070037E-04 | 3.817596E-06 | 9.372580E-07 | -1.113491E-07 | 3.680990E-09 | |
| 671 | 7.698147E-04 | -9.938833E-05 | 7.452847E-06 | -3.018881E-07 | 5.107310E-09 | |
| 672 | 4.472900E-05 | -4.526461E-06 | 2.688228E-07 | -8.560070E-09 | 1.101400E-10 | |

FIG.29

| Effective focal length (EFL) = 4.412 mm, HFOV (Half field of view) = 39.435deg., TTL = 6.027 mm, Image height= 4.18 mm, Fno = 1.7 |||||||
|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 711 | 1st lens element | 2.344 | 0.709 | 1.545 | 55.987 | 6.108 | Plastic |
| 712 | | 7.041 | 0.040 | | | | |
| 700 | Aperture stop | INFINITY | 0.057 | | | | |
| 721 | 2nd lens element | 3.448 | 0.298 | 1.661 | 20.412 | -41.371 | Plastic |
| 722 | | 2.959 | 0.414 | | | | |
| 731 | 3rd lens element | -29.917 | 0.454 | 1.545 | 55.987 | 8.637 | Plastic |
| 732 | | -4.097 | 0.046 | | | | |
| 741 | 4th lens element | 8.458 | 0.300 | 1.661 | 20.412 | -13.139 | Plastic |
| 742 | | 4.244 | 0.447 | | | | |
| 751 | 5th lens element | -2.740 | 0.722 | 1.545 | 55.987 | 4.917 | Plastic |
| 752 | | -1.483 | 0.043 | | | | |
| 761 | 6th lens element | 2.268 | 0.419 | 1.545 | 55.987 | -13.735 | Plastic |
| 762 | | 1.628 | 0.792 | | | | |
| 771 | 7th lens element | -11.500 | 0.427 | 1.545 | 55.987 | -6.145 | Plastic |
| 772 | | 4.802 | 0.200 | | | | |
| 781 | IR cut filter | INFINITY | 0.510 | 1.563 | 51.300 | | |
| 782 | | INFINITY | 0.150 | | | | |
| IM7 | Image plane | INFINITY | | | | | |

FIG.32

| Aspherical parameters | | | | | | |
|---|---|---|---|---|---|---|
| Surface # | K | $a_2$ | $a_4$ | $a_6$ | $a_8$ | $a_{10}$ |
| 711 | -1.628018E-01 | 0.000000E+00 | 2.483630E-03 | 2.022174E-03 | -7.457231E-03 | 9.713753E-03 |
| 712 | -9.338689E+00 | 0.000000E+00 | -5.334415E-02 | 1.687502E-02 | 3.550541E-03 | -1.777590E-03 |
| 721 | 1.029424E+00 | 0.000000E+00 | -9.101336E-02 | 4.085900E-03 | -5.856439E-04 | 3.522127E-02 |
| 722 | -1.602965E-02 | 0.000000E+00 | -3.107305E-02 | -3.610359E-02 | 2.363032E-02 | 9.206479E-03 |
| 731 | 4.898956E-02 | 0.000000E+00 | 5.589229E-02 | -3.312351E-02 | -3.602275E-03 | -2.796343E-02 |
| 732 | -2.010068E+01 | 0.000000E+00 | 1.212914E-01 | -1.595986E-01 | 8.605090E-02 | -2.038423E-02 |
| 741 | -3.950906E+00 | 0.000000E+00 | -4.688791E-03 | -8.617600E-02 | 3.599580E-03 | 5.559691E-02 |
| 742 | -3.637641E+01 | 0.000000E+00 | -2.734355E-02 | -1.202873E-03 | -4.012019E-02 | 4.679704E-02 |
| 751 | -6.335156E-01 | 0.000000E+00 | 3.949545E-02 | -1.331055E-02 | 5.370512E-03 | -8.589044E-03 |
| 752 | -1.958844E+00 | 0.000000E+00 | 1.333072E-02 | -3.534800E-02 | 3.374094E-02 | -2.003685E-02 |
| 761 | -9.237239E+00 | 0.000000E+00 | -2.142288E-02 | -9.926591E-03 | 6.565586E-03 | -3.429172E-03 |
| 762 | -6.319829E+00 | 0.000000E+00 | -2.788804E-02 | 5.202326E-03 | -2.539282E-03 | 7.385545E-04 |
| 771 | -2.096548E+00 | 0.000000E+00 | -3.348952E-02 | -2.121960E-03 | 7.846206E-03 | -3.435130E-03 |
| 772 | -1.281410E+01 | 0.000000E+00 | -2.795181E-02 | 2.705567E-03 | 5.981810E-04 | -2.550586E-04 |
| Surface # | $a_{12}$ | $a_{14}$ | $a_{16}$ | $a_{18}$ | $a_{20}$ | |
| 711 | -6.481592E-03 | 2.042987E-03 | -2.911112E-04 | 0.000000E+00 | 0.000000E+00 | |
| 712 | -3.238408E-03 | 2.079496E-03 | -3.736025E-04 | 0.000000E+00 | 0.000000E+00 | |
| 721 | -3.653292E-02 | 1.503404E-02 | -2.242548E-03 | 0.000000E+00 | 0.000000E+00 | |
| 722 | -1.668626E-02 | 6.886744E-03 | -8.839691E-04 | 0.000000E+00 | 0.000000E+00 | |
| 731 | 4.002870E-02 | -2.280176E-02 | 4.870985E-03 | 0.000000E+00 | 0.000000E+00 | |
| 732 | -1.166917E-02 | 8.093082E-03 | -1.259902E-03 | 0.000000E+00 | 0.000000E+00 | |
| 741 | -5.133113E-02 | 2.025740E-02 | -3.019142E-03 | 0.000000E+00 | 0.000000E+00 | |
| 742 | -2.604141E-02 | 7.346144E-03 | -4.519593E-04 | -2.345753E-04 | 3.997585E-05 | |
| 751 | 5.676316E-03 | -1.317123E-03 | 9.119899E-05 | -1.462974E-06 | -2.801856E-07 | |
| 752 | 6.846468E-03 | -6.484032E-04 | -2.051356E-04 | 4.863328E-05 | -2.588656E-06 | |
| 761 | 1.101416E-03 | -1.779850E-04 | 6.481721E-06 | 1.534925E-06 | -1.542512E-07 | |
| 762 | -1.076829E-04 | 3.693708E-06 | 9.350219E-07 | -1.109831E-07 | 3.660540E-09 | |
| 771 | 7.696318E-04 | -9.939538E-05 | 7.453634E-06 | -3.017795E-07 | 5.103250E-09 | |
| 772 | 4.469785E-05 | -4.527085E-06 | 2.688076E-07 | -8.559650E-09 | 1.103100E-10 | |

FIG.33

| Effective focal length (EFL) = 4.765 mm, HFOV (Half field of view) = 39.255deg., TTL = 6.316 mm, Image height= 4.18 mm, Fno = 1.698 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 800 | Aperture stop | INFINITY | -0.477 | | | | |
| 811 | 1st lens element | 2.258 | 0.801 | 1.545 | 55.987 | 5.631 | Plastic |
| 812 | | 7.425 | 0.100 | | | | |
| 821 | 2nd lens element | 3.460 | 0.188 | 1.661 | 20.412 | -31.984 | Plastic |
| 822 | | 2.913 | 0.503 | | | | |
| 831 | 3rd lens element | -9.906 | 0.385 | 1.545 | 55.987 | 15.021 | Plastic |
| 832 | | -4.550 | 0.086 | | | | |
| 841 | 4th lens element | -29.101 | 0.525 | 1.661 | 20.412 | -21.634 | Plastic |
| 842 | | 28.844 | 0.277 | | | | |
| 851 | 5th lens element | -2.093 | 0.566 | 1.545 | 55.987 | 10.840 | Plastic |
| 852 | | -1.694 | 0.180 | | | | |
| 861 | 6th lens element | 3.153 | 0.468 | 1.545 | 55.987 | 19.092 | Plastic |
| 862 | | 4.282 | 1.175 | | | | |
| 871 | 7th lens element | -8.769 | 0.150 | 1.535 | 55.690 | -5.221 | Plastic |
| 872 | | 4.141 | 0.200 | | | | |
| 881 | IR cut filter | INFINITY | 0.510 | 1.517 | 64.167 | | |
| 882 | | INFINITY | 0.203 | | | | |
| IM8 | Image plane | INFINITY | | | | | |

FIG.36

| | Aspherical parameters | | | | |
|---|---|---|---|---|---|
| Surface # | K | $a_2$ | $a_4$ | $a_6$ | $a_8$ | $a_{10}$ |
| 811 | -3.058635E-01 | 0.000000E+00 | 6.059284E-03 | 3.167075E-03 | -7.057828E-03 | 9.309014E-03 |
| 812 | -1.554267E+00 | 0.000000E+00 | -4.204994E-02 | 1.364927E-02 | 7.507568E-04 | -5.093970E-04 |
| 821 | 8.263235E-01 | 0.000000E+00 | -8.164815E-02 | 5.080726E-03 | -2.883620E-04 | 3.496865E-02 |
| 822 | 3.588546E-01 | 0.000000E+00 | -3.547573E-02 | -1.968366E-02 | 2.139344E-02 | 8.990776E-03 |
| 831 | -1.474896E+02 | 0.000000E+00 | 2.516526E-02 | -1.675915E-02 | -8.303710E-04 | -2.936835E-02 |
| 832 | -1.325010E+01 | 0.000000E+00 | 1.017324E-01 | -1.503873E-01 | 8.552520E-02 | -2.164824E-02 |
| 841 | 0.000000E+00 | 0.000000E+00 | 9.427584E-03 | -9.034660E-02 | 3.632157E-03 | 5.575311E-02 |
| 842 | -4.915374E+01 | 0.000000E+00 | -2.245057E-02 | -1.296585E-03 | -2.755979E-02 | 2.793273E-02 |
| 851 | -2.755177E+00 | 0.000000E+00 | 3.742143E-02 | -2.045665E-02 | 5.281396E-03 | -7.263732E-03 |
| 852 | -2.196581E+00 | 0.000000E+00 | -8.807113E-03 | -2.583794E-02 | 2.639931E-02 | -1.536231E-02 |
| 861 | -3.273891E-01 | 0.000000E+00 | -2.089805E-02 | -8.537603E-03 | 5.768177E-03 | -3.296471E-03 |
| 862 | 9.085005E-01 | 0.000000E+00 | -1.067623E-02 | 6.850964E-05 | -3.016405E-03 | 1.113515E-03 |
| 871 | 5.781671E+00 | 0.000000E+00 | -3.781363E-02 | -3.597672E-03 | 9.948754E-03 | -4.564798E-03 |
| 872 | -7.837788E+00 | 0.000000E+00 | -3.223824E-02 | 3.207345E-03 | 1.827496E-03 | -1.019528E-03 |
| Surface # | $a_{12}$ | $a_{14}$ | $a_{16}$ | $a_{18}$ | $a_{20}$ | |
| 811 | -6.410457E-03 | 2.200415E-03 | -3.246190E-04 | 0.000000E+00 | 0.000000E+00 | |
| 812 | -2.422815E-03 | 1.611283E-03 | -3.144988E-04 | 0.000000E+00 | 0.000000E+00 | |
| 821 | -3.649949E-02 | 1.539037E-02 | -2.364256E-03 | 0.000000E+00 | 0.000000E+00 | |
| 822 | -1.601236E-02 | 6.500644E-03 | -6.622787E-04 | 0.000000E+00 | 0.000000E+00 | |
| 831 | 3.973178E-02 | -2.285830E-02 | 4.895972E-03 | 0.000000E+00 | 0.000000E+00 | |
| 832 | -1.139530E-02 | 8.023081E-03 | -1.308101E-03 | 0.000000E+00 | 0.000000E+00 | |
| 841 | -5.162453E-02 | 2.010790E-02 | -3.034124E-03 | 0.000000E+00 | 0.000000E+00 | |
| 842 | -1.392318E-02 | 3.563712E-03 | -2.162687E-04 | -1.005390E-04 | 1.819029E-05 | |
| 851 | 4.955184E-03 | -1.176524E-03 | 9.125933E-05 | 0.000000E+00 | 0.000000E+00 | |
| 852 | 5.020195E-03 | -4.410065E-04 | -1.322017E-04 | 3.069995E-05 | -1.804195E-06 | |
| 861 | 1.056944E-03 | -1.667761E-04 | 6.149586E-06 | 1.443017E-06 | -1.317713E-07 | |
| 862 | -1.704016E-04 | 5.839496E-06 | 1.714201E-06 | -2.201161E-07 | 7.812810E-09 | |
| 871 | 1.084744E-03 | -1.483961E-04 | 1.177907E-05 | -5.051866E-07 | 9.070350E-09 | |
| 872 | 2.397308E-04 | -3.186844E-05 | 2.486149E-06 | -1.064257E-07 | 1.931790E-09 | |

FIG.37

| Embodiment | 1st | 2nd | 3rd | 4th | 5th | 6th | 7th | 8th |
|---|---|---|---|---|---|---|---|---|
| T1 | 0.765 | 1.074 | 0.752 | 0.242 | 0.734 | 0.867 | 0.709 | 0.801 |
| G12 | 0.067 | 0.243 | 0.089 | 0.455 | 0.085 | 0.088 | 0.097 | 0.100 |
| T2 | 0.305 | 0.449 | 0.161 | 0.999 | 0.332 | 0.329 | 0.298 | 0.188 |
| G23 | 0.622 | 0.326 | 0.565 | 0.413 | 0.456 | 0.415 | 0.414 | 0.503 |
| T3 | 0.197 | 0.364 | 0.342 | 0.126 | 0.375 | 0.499 | 0.454 | 0.385 |
| G34 | 0.046 | 0.014 | 0.061 | 0.052 | 0.076 | 0.028 | 0.046 | 0.086 |
| T4 | 0.573 | 0.282 | 0.278 | 0.051 | 0.307 | 0.355 | 0.300 | 0.525 |
| G45 | 0.437 | 0.424 | 0.386 | 0.375 | 0.441 | 0.365 | 0.447 | 0.277 |
| T5 | 0.555 | 0.411 | 0.665 | 0.258 | 0.678 | 0.790 | 0.722 | 0.566 |
| G56 | 0.020 | 0.005 | 0.245 | 0.754 | 0.040 | 0.001 | 0.043 | 0.180 |
| T6 | 0.426 | 0.387 | 0.158 | 0.730 | 0.445 | 0.479 | 0.419 | 0.468 |
| G67 | 0.302 | 0.763 | 1.667 | 0.552 | 0.801 | 0.416 | 0.792 | 1.175 |
| T7 | 0.553 | 0.133 | 0.143 | 0.047 | 0.578 | 0.623 | 0.427 | 0.150 |
| G7F | 0.400 | 0.200 | 0.200 | 0.300 | 0.200 | 0.300 | 0.200 | 0.200 |
| TF | 0.510 | 0.510 | 0.510 | 0.510 | 0.510 | 0.510 | 0.510 | 0.510 |
| GFP | 0.404 | 0.493 | 0.088 | 0.433 | 0.313 | 0.256 | 0.150 | 0.203 |
| AAG | 1.495 | 1.776 | 3.013 | 2.601 | 1.900 | 1.313 | 1.838 | 2.320 |
| ALT | 3.374 | 3.099 | 2.499 | 2.453 | 3.450 | 3.944 | 3.329 | 3.082 |
| BFL | 1.314 | 1.203 | 0.798 | 1.243 | 1.023 | 1.066 | 0.860 | 0.913 |
| TTL | 6.183 | 6.077 | 6.310 | 6.297 | 6.373 | 6.323 | 6.027 | 6.316 |
| TL | 4.869 | 4.874 | 5.512 | 5.054 | 5.350 | 5.256 | 5.167 | 5.403 |
| EFL | 4.788 | 4.788 | 3.515 | 1.836 | 4.923 | 4.464 | 4.412 | 4.765 |
| V1 | 55.987 | 55.987 | 55.987 | 55.987 | 55.987 | 55.987 | 55.987 | 55.987 |
| V2 | 20.412 | 20.412 | 20.412 | 20.412 | 55.987 | 20.412 | 20.412 | 20.412 |
| V3 | 55.987 | 55.987 | 55.987 | 55.987 | 55.987 | 55.987 | 55.987 | 55.987 |
| V4 | 20.412 | 20.412 | 20.412 | 20.412 | 55.987 | 20.412 | 20.412 | 20.412 |
| V5 | 55.987 | 55.987 | 55.987 | 55.987 | 55.987 | 55.987 | 55.987 | 55.987 |
| V6 | 55.987 | 55.987 | 55.987 | 55.987 | 55.987 | 55.987 | 55.987 | 55.987 |
| V7 | 55.987 | 55.987 | 55.987 | 55.987 | 55.987 | 55.987 | 55.987 | 55.690 |

FIG.38A

| Embodiment | 1st | 2nd | 3rd | 4th | 5th | 6th | 7th | 8th |
|---|---|---|---|---|---|---|---|---|
| V4+V5+V6+V7 | 188.373 | 188.373 | 188.373 | 188.373 | 223.948 | 188.373 | 188.373 | 188.076 |
| (T5+G56)/G45 | 1.313 | 0.980 | 2.358 | 2.700 | 1.627 | 2.162 | 1.711 | 2.698 |
| (T5+G56)/G67 | 1.900 | 0.545 | 0.546 | 1.833 | 0.897 | 1.900 | 0.965 | 0.635 |
| (T3+G34+T4)/G45 | 1.866 | 1.557 | 1.763 | 0.612 | 1.719 | 2.415 | 1.792 | 3.600 |
| (T3+G34+T4)/G67 | 2.700 | 0.865 | 0.408 | 0.415 | 0.948 | 2.123 | 1.011 | 0.848 |
| EFL/T1 | 6.258 | 4.459 | 4.674 | 7.601 | 6.709 | 5.147 | 6.227 | 5.947 |
| EFL/AAG | 3.204 | 2.696 | 1.167 | 0.706 | 2.591 | 3.400 | 2.400 | 2.054 |
| TTL/AAG | 4.137 | 3.422 | 2.095 | 2.421 | 3.354 | 4.816 | 3.279 | 2.722 |
| BFL/(G12+T2+G34+G56) | 3.000 | 1.691 | 1.435 | 0.550 | 1.917 | 2.394 | 1.777 | 1.649 |
| ALT/G23 | 5.423 | 9.500 | 4.424 | 5.943 | 7.558 | 9.500 | 8.048 | 6.127 |
| TL/(G12+T2+G34+G56) | 11.113 | 6.856 | 9.909 | 2.236 | 10.027 | 11.800 | 10.683 | 9.761 |
| TL/(T1+G12+T2) | 4.280 | 2.761 | 5.500 | 2.982 | 4.648 | 4.093 | 4.683 | 4.964 |
| TTL/(T1+G12+T2) | 5.435 | 3.442 | 6.297 | 3.715 | 5.537 | 4.924 | 5.462 | 5.803 |
| ALT/BFL | 2.567 | 2.576 | 3.131 | 1.973 | 3.373 | 3.698 | 3.873 | 3.377 |
| T7/T6 | 1.300 | 0.343 | 0.903 | 0.065 | 1.300 | 1.300 | 1.020 | 0.320 |
| TL/(T6+G67+T7) | 3.800 | 3.800 | 2.801 | 3.800 | 2.933 | 3.461 | 3.154 | 3.014 |
| ALT/AAG | 2.257 | 1.745 | 0.830 | 0.943 | 1.816 | 3.004 | 1.811 | 1.329 |
| TTL/(G23+G45) | 5.835 | 8.100 | 6.636 | 7.995 | 7.098 | 8.100 | 7.004 | 8.100 |
| (G23+T6+T7)/(T1+G67) | 1.500 | 0.460 | 0.358 | 1.500 | 0.965 | 1.183 | 0.840 | 0.567 |

FIG.38B

OPTICAL IMAGING LENS

CROSS REFERENCE TO RELATED APPLICATION

This application claims priority to P.R.C. Patent Application No. 201711144494.0, filed Nov. 17, 2017 with the State Intellectual Property Office of the People's Republic of China (SIPO), which is incorporated herein by its entirety.

TECHNICAL FIELD

The present disclosure relates to an optical imaging lens, and particularly, to an optical imaging lens having seven lens elements.

BACKGROUND

The ever-increasing demand for smaller sized electrical devices, such as cell phones, digital cameras, tablet computers, personal digital assistants (PDAs), vehicle electronics, etc. has lead to a corresponding need for smaller sized photography modules contained within such devices. Such modules may include optical imaging lenses, module housing units, image sensors, etc. Size reductions may be achieved from various aspects of the electrical devices, which may include not only the charge coupled device (CCD) and the complementary metal-oxide semiconductor (CMOS), but also the optical imaging lens mounted therein. When reducing the size of the optical imaging lens, however, achieving good optical characteristics may become a challenge. Furthermore, achieving a high view angle and a great aperture size are important in certain applications, such as situations where a photography module is used in vehicles.

In light of the above issues, designing an optical imaging lens with a shorter length is not easily achieved by merely decreasing the size of each element proportionally. This is especially true for an optical imaging lens mounted with, for example, seven lens elements, in which the distance between an object-side surface of the first lens element and an imaging plane along an optical axis may be great. Size reductions of an optical imaging lens cannot be achieved simply by proportionally shrinking the size of each element therein. Various aspects of the optical imaging lens, such as production difficulty, yield, material property, etc. should be taken into consideration.

Therefore, production of a smaller sized optical imaging lens presents higher technical barriers and challenges than that of a conventional lens. Accordingly, achieving good optical characteristics in view of the various relevant considerations and technical barriers is a challenge in the industry.

SUMMARY

The present disclosure is directed to optical imaging lenses. By designing the convex and/or concave surfaces of at least seven lens elements, the imaging quality and yield may be increased.

In the present disclosure, parameters used herein may be chosen from but not limited to the parameters listed below:

| Parameter | Definition |
| --- | --- |
| T1 | A thickness of the first lens element along the optical axis |
| G12 | A distance between the image-side surface of the first lens element and the object-side surface of the second lens element along the optical axis |
| T2 | A thickness of the second lens element along the optical axis |
| G23 | A distance between the image-side surface of the second lens element and the object-side surface of third lens element along the optical axis |
| T3 | A thickness of the third lens element along the optical axis |
| G34 | A distance between the image-side surface of the third lens element and the object-side surface of the fourth lens element along the optical axis |
| T4 | A thickness of the fourth lens element along the optical axis |
| G45 | A distance between the image-side surface of the fourth lens element and the object-side surface of the fifth lens element along the optical axis |
| T5 | A thickness of the fifth lens element along the optical axis |
| G56 | A distance between the image-side surface of the fifth lens element and the object-surface of the sixth lens element along the optical axis |
| T6 | A thickness of the sixth lens element along the optical axis |
| G67 | A distance between the image-side surface of the sixth lens element and the object-side surface of the seventh lens element along the optical axis |
| T7 | A thickness of the seventh lens element along the optical axis |
| G7F | An distance between the image-side surface of the seventh lens element and the object-side surface of the filtering unit along the optical axis |
| TF | A thickness of the filtering unit along the optical axis |
| GFP | A distance between the filtering unit and the image plane along the optical axis |
| f1 | A focal length of the first lens element |
| f2 | A focal length of the second lens element |
| f3 | A focal length of the third lens element |
| f4 | A focal length of the fourth lens element |
| f5 | A focal length of the fifth lens element |
| f6 | A focal length of the sixth lens element |
| f7 | A focal length of the seventh lens element |
| n1 | A refractive index of the first lens element |
| n2 | A refractive index of the second lens element |
| n3 | A refractive index of the third lens element |
| n4 | A refractive index of the fourth lens element |
| n5 | A refractive index of the fifth lens element |
| n6 | A refractive index of the sixth lens element |
| n7 | A refractive index of the seventh lens element |
| V1 | An Abbe number of the first lens element |
| V2 | An Abbe number of the second lens element |

-continued

| Parameter | Definition |
|---|---|
| V3 | An Abbe number of the third lens element |
| V4 | An Abbe number of the fourth lens element |
| V5 | An Abbe number of the fifth lens element |
| V6 | An Abbe number of the sixth lens element |
| V7 | An Abbe number of the seventh lens element |
| HFOV | Half Field of View of the optical imaging lens |
| Fno | F-number of the optical imaging lens |
| EFL | An effective focal length of the optical imaging lens |
| TTL | A distance from the object-side surface of the first lens element to the image plane along the optical axis |
| ALT | A sum of the thicknesses of the first lens element, the second element, the third element, the fourth element, the fifth element, the sixth element, and the seventh lens element along the optical axis |
| AAG | A sum of a distance between the image-side surface of the first lens element and the object-side surface of the second lens element along the optical axis, a distance between the image-side surface of the second lens element and the object-side surface of the third lens element along the optical axis, a distance between the image-side surface of the third lens element and the object-side surface of the fourth lens element along the optical axis, a distance between the image-side surface of the fourth lens element and the object-side surface of the fifth lens element along the optical axis, a distance between the image-side surface of the fifth lens element and the object-side surface of the sixth lens element along the optical axis, and a distance between the image-side surface of the sixth lens element and the object-side surface of the seventh lens element along the optical axis |
| BFL | A back focal length of the optical imaging lens/A distance from the image-side surface of the seventh lens element to the image plane along the optical axis |
| TL | A distance from the object-side surface of the first lens element to the image-side surface of the seventh lens element along the optical axis |

According to one embodiment of the present disclosure, an optical imaging lens may comprise a first lens element, a second lens element, a third lens element, a fourth lens element, a fifth lens element, a sixth lens element, and a seventh lens element sequentially from an object side to an image side along an optical axis, the first lens element to the seventh lens element may each comprise an object-side surface facing toward the object side and allowing imaging rays to pass through and an image-side surface facing toward the image side and allowing the imaging rays to pass through. Moreover, the object-side surface of the third lens element may comprise a concave portion in a vicinity of the optical axis; the fifth lens element may have positive refracting power; the object-side surface of the fifth lens element may comprise a concave portion in a vicinity of the optical axis; the object-side surface of the sixth lens element may comprise a convex portion in a vicinity of the optical axis; the object-side surface of the seventh lens element may comprise a concave portion in a vicinity of the optical axis; the image-side surface of the seventh lens element may comprise a concave portion in a vicinity of the optical axis.

According to another embodiment of the present disclosure, an optical imaging lens may comprise a first lens element, a second lens element, a third lens element, a fourth lens element, a fifth lens element, a sixth lens element, and a seventh lens element sequentially from an object side to an image side along an optical axis, the first lens element to the seventh lens element may each comprise an object-side surface facing toward the object side and allowing imaging rays to pass through and an image-side surface facing toward the image side and allowing the imaging rays to pass through. There are only the first lens element, the second lens element, the third lens element, the fourth lens element, the fifth lens element, the sixth lens element, and the seventh lens element having refracting power in the optical imaging lens. Moreover, the object-side surface of the third lens element may comprise a concave portion in a vicinity of the optical axis; the fifth lens element may have positive refracting power; the object-side surface of the fifth lens element may comprise a concave portion in a vicinity of the optical axis; the object-side surface of the sixth lens element may comprise a convex portion in a vicinity of the optical axis; the image-side surface of the seventh lens element may comprise a concave portion in a vicinity of the optical axis; the image-side surface of the seventh lens element may comprise a concave portion in a vicinity of the optical axis; an Abbe number of the fourth lens element is represented by V4; an Abbe number of the fifth lens element is represented by V5; an Abbe number of the sixth lens element is represented by V6; an Abbe number of seventh lens element is represented by V7, the optical imaging lens satisfies an inequality (1): $V4+V5+V6+V7 \geq 180$.

One embodiment of the optical imaging lens may satisfy any one of inequalities as follows:

| | |
|---|---|
| $(T5+G56)/G45 \leq 2.700$ | inequality (2); |
| $(T3+G34+T4)/G67 \leq 2.700$ | inequality (3); |
| $TTL/(T1+G12+T2) \leq 6.800$ | inequality (4); |
| $EFL/AAG \leq 3.400$ | inequality (5); |
| $TL/(T1+G12+T2) \leq 5.500$ | inequality (6); |
| $ALT/G23 \leq 9.500$ | inequality (7); |
| $TTL/AAG \leq 4.900$ | inequality (8); |
| $BFL/(G12+T2+G34+G56) \leq 3.000$ | inequality (9); |
| $T7/T6 \leq 1.300$ | inequality (10); |
| $(T5+G56)/G67 \leq 1.900$ | inequality (11); |
| $(T3+G34+T4)/G45 \leq 3.600$ | inequality (12); |

$$TTL/(G23+G45) \leq 8.100 \qquad \text{inequality (13)};$$

$$EFL/T1 \leq 7.700 \qquad \text{inequality (14)};$$

$$TL/(G12+T2+G34+G56) \leq 11.800 \qquad \text{inequality (15)};$$

$$ALT/AAG \leq 3.100 \qquad \text{inequality (16)};$$

$$ALT/BFL \leq 3.800 \qquad \text{inequality (17)};$$

$$TL/(T6+G67+T7) \leq 3.900 \qquad \text{inequality (18); and}$$

$$(G23+T6+T7)/(T1+G67) \leq 1.500 \qquad \text{inequality (19)}.$$

BRIEF DESCRIPTION OF THE DRAWINGS

Exemplary embodiments will be more readily understood from the following detailed description when read in conjunction with the appended drawing, in which:

FIG. 1 depicts a cross-sectional view of one single lens element according to one embodiment of the present disclosure;

FIG. 2 depicts a schematic view of a relation between a surface shape and an optical focus of a lens element;

FIG. 3 depicts a schematic view of a first example of a surface shape and an effective radius of a lens element;

FIG. 4 depicts a schematic view of a second example of a surface shape and an effective radius of a lens element;

FIG. 5 depicts a schematic view of a third example of a surface shape and an effective radius of a lens element;

FIG. 8 depicts a table of optical data for each lens element of an optical imaging lens of a first embodiment of the present disclosure;

FIG. 9 depicts a table of aspherical data of a first embodiment of an optical imaging lens according to the present disclosure;

FIG. 12 depicts a table of optical data for each lens element of an optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of an optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of a sixth embodiment of an optical imaging lens according to the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of an eighth embodiment of an optical imaging lens according to the present disclosure;

FIG. 37 depicts a table of aspherical data of an eighth embodiment of the optical imaging lens according to the present disclosure;

FIGS. 38A and 38B are value tables reflecting determined values of T1, G12, T2, G23, T3, G34, T4, G45, T5, G56, T6, G67, T7, G7F, TF, GFP, AAG, ALT, BFL, TTL, TL, EFL, V1, V2, V3, V4, V5, V6, V7, V4+V5+V6+V7, (T5+G56)/G45, (T5+G56)/G67, (T3+G34+T4)/G45, (T3+G34+T4)/G67, EFL/T1, EFL/AAG, TTL/AAG, BFL/(G12+T2+G34+G56), ALT/G23, TL/(G12+T2+G34+G56), TL/(T1+G12+T2), TTL/(T1+G12+T2), ALT/BFL, T7/T6, TL/(T6+G67+T7), ALT/AAG, TTL/(G23+G45), (G23+T6+T7)/(T1+G67) as determined in specific example embodiments.

DETAILED DESCRIPTION

Figure 6:
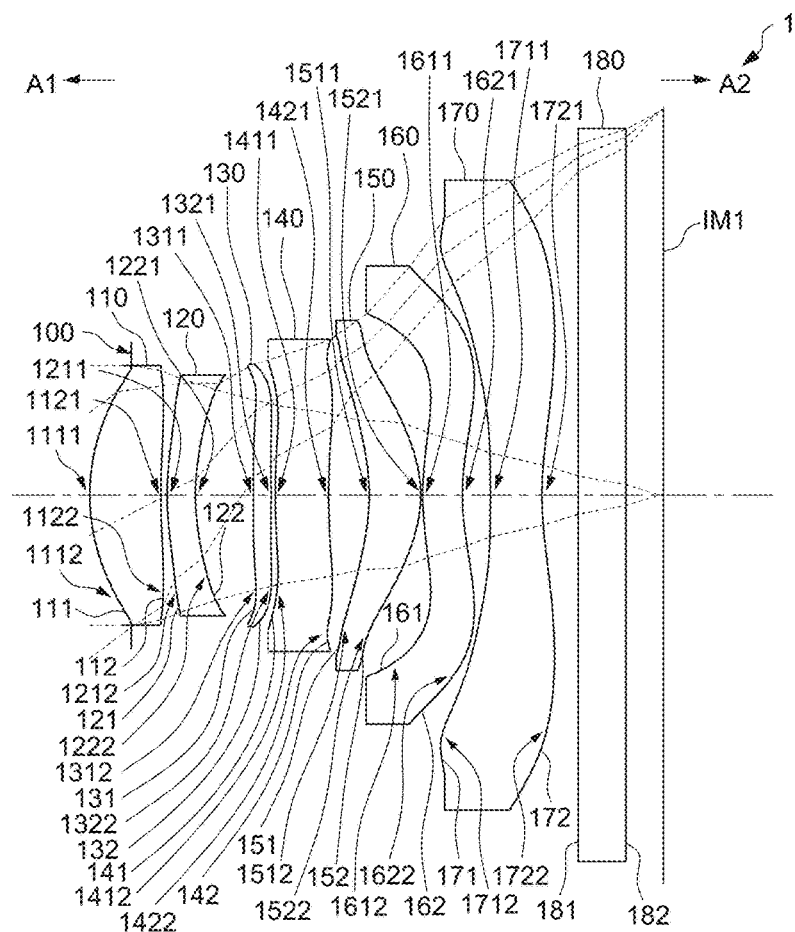
FIG. 6 depicts a cross-sectional view of a first embodiment of an optical imaging lens having eight lens elements according to one embodiment of the present disclosure.

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius may be determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 7:
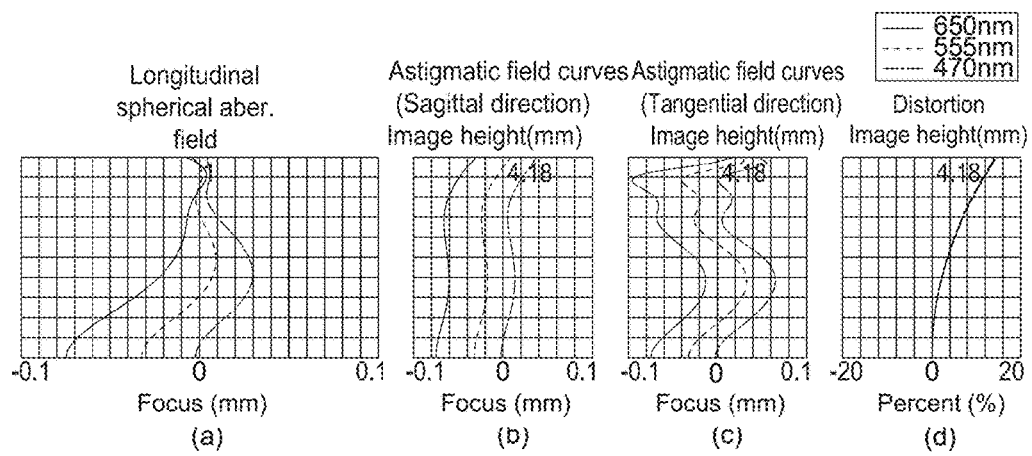
FIG. 7 depicts a chart of longitudinal spherical aberration and other kinds of optical aberrations of a first embodiment of an optical imaging lens according to the present disclosure.

Several exemplary embodiments and associated optical data will now be provided to illustrate non-limiting examples of optical imaging lens systems having good optical characteristics while increasing the field of view. Reference is now made to FIGS. 6-9. FIG. 6 illustrates an example cross-sectional view of an optical imaging lens 1 having seven lens elements according to a first example embodiment. FIG. 7 shows example charts of longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130, a fourth lens element 140, a fifth lens element 150 a sixth lens element 160, and a seventh lens element 170. A filtering unit 180 and an image plane IM1 of an image sensor (not shown) may be positioned at the image side A2 of the optical imaging lens 1. Each of the first, second, third, fourth, fifth sixth, and seventh lens elements 110, 120, 130, 140, 150, 160, 170 and the filtering unit 180 may comprise an object-side surface 111/121/131/141/151/161/171/181 facing toward the object side A1 and an image-side surface 112/122/132/142/152/162/172/182 facing toward the image side A2. The example embodiment of the filtering unit 180 illustrated may be an IR cut filter (infrared cut filter) positioned between the seventh lens element 170 and the image plane IM1. The filtering unit 180 may selectively absorb light passing optical imaging lens 1 that has a specific wavelength. For example, if IR light is absorbed, IR light which is not seen by human eyes may be prohibited from producing an image on the image plane IM1.

Exemplary embodiments of each lens element of the optical imaging lens 1 will now be described with reference to the drawings. The lens elements of the optical imaging lens 1 may be constructed using plastic materials in this embodiment.

An example embodiment of the first lens element 110 may have positive refracting power. The object-side surface 111 may comprise a convex portion 1111 in a vicinity of an optical axis and a convex portion 1112 in a vicinity of a periphery of the first lens element 110. The image-side surface 112 may comprise a concave portion 1121 in a vicinity of the optical axis and a convex portion 1122 in a vicinity of the periphery of the first lens element 110.

An example embodiment of the second lens element 120 may have negative refracting power. The object-side surface 121 may comprise a convex portion 1211 in a vicinity of the optical axis and a convex portion 1212 in a vicinity of a periphery of the second lens element 120. The image-side surface 122 may comprise a concave portion 1221 in a vicinity of the optical axis and a concave portion 1222 in a vicinity of the periphery of the second lens element 120.

An example embodiment of the third lens element 130 may have positive refracting power. The object-side surface 131 may comprise a concave portion 1311 in a vicinity of the optical axis and a concave portion 1312 in a vicinity of a periphery of the third lens element 130. The image-side surface 132 may comprise a convex portion 1321 in a vicinity of the optical axis and a convex portion 1322 in a vicinity of the periphery of the third lens element 130.

An example embodiment of the fourth lens element 140 may have negative refracting power. The object-side surface 141 may comprise a convex portion 1411 in a vicinity of the optical axis and a concave portion 1412 in a vicinity of a periphery of the fourth lens element 140. The image-side surface 142 may comprise a concave portion 1421 in a vicinity of the optical axis and a concave portion 1422 in a vicinity of the periphery of the fourth lens element 140.

An example embodiment of the fifth lens element 150 may have positive refracting power. The object-side surface 151 may comprise a concave portion 1511 in a vicinity of the optical axis and a concave portion 1512 in a vicinity of a periphery of the fifth lens element 150. The image-side surface 152 may comprise a convex portion 1521 in a vicinity of the optical axis and a convex portion 1522 in a vicinity of the periphery of the fifth lens element 150.

An example embodiment of the sixth lens element 160 may have negative refracting power. The object-side surface 161 may comprise a convex portion 1611 in a vicinity of the optical axis and a concave portion 1612 in a vicinity of a periphery of the sixth lens element 160. The image-side surface 162 may comprise a concave portion 1621 in a vicinity of the optical axis and a convex portion 1622 in a vicinity of the periphery of the sixth lens element 160.

An example embodiment of the seventh lens element 170 may have negative refracting power. The object-side surface 171 may comprise a concave portion 1711 in a vicinity of the optical axis and a convex portion 1712 in a vicinity of a periphery of the seventh lens element 170. The image-side surface 172 may comprise a concave portion 1721 in a vicinity of the optical axis and a convex portion 1722 in a vicinity of the periphery of the seventh lens element 170.

The aspherical surfaces including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, the object-side surface 161 and the image-side surface 162 of the sixth lens element 160, and the object-side surface 171 and the image-side surface 172 of the seventh lens element 170 may all be defined by the following aspherical formula (1):

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad \text{formula (1)}$$

wherein,

R represents the radius of curvature of the surface of the lens element;

Z represents the depth of the aspherical surface (i.e., the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_{2i}$ represents an aspherical coefficient of $2i^{th}$ level.

Values of each aspherical parameter are shown in FIG. 9.

FIG. 7(a) shows the longitudinal spherical aberration, wherein the horizontal axis of FIG. 7(a) defines the focus, and wherein the vertical axis of FIG. 7(a) defines the field of view. FIG. 7(b) shows the astigmatism aberration in the sagittal direction, wherein the horizontal axis of FIG. 7(b) defines the focus, and wherein the vertical axis of FIG. 7(b) defines the image height. FIG. 7(c) shows the astigmatism aberration in the tangential direction, wherein the horizontal axis of FIG. 7(c) defines the focus, and wherein the vertical axis of FIG. 7(c) defines the image height. FIG. 7(d) shows a variation of the distortion aberration, wherein the horizontal axis of FIG. 7(d) defines the percentage, and wherein the vertical axis of FIG. 7(d) defines the image height. The three curves with different wavelengths (470 nm, 555 nm, 650 nm) may represent that off-axis light with respect to these wavelengths may be focused around an image point. From the vertical deviation of each curve shown in FIG. 7(a), the offset of the off-axis light relative to the image point may be within about ±0.08 mm. Therefore, the first embodiment may improve the longitudinal spherical aberration with respect to different wavelengths. Referring to FIG. 7(b), the focus variation with respect to the three different wavelengths (470 nm, 555 nm, 650 nm) in the whole field may fall within about ±0.08 mm. Referring to FIG. 7(c), the focus variation with respect to the three different wavelengths (470 nm, 555 nm, 650 nm) in the whole field may fall within about ±0.1 mm. Referring to FIG. 7(d), the horizontal axis of FIG. 7(d), the variation of the distortion aberration may be within about ±14%.

The distance from the object-side surface 111 of the first lens element 110 to the image plane IM1 along the optical axis (TTL) may be about 6.183 mm, the value of Fno is 1.698, and the half field of view (HFOV) is 37.172 degree. In accordance with aberration values described above, the present embodiment may provide an optical imaging lens 1 having thin thickness and good imaging quality.

The values of T1, G12, T2, G23, T3, G34, T4, G45, T5, G56, T6, G67, T7, G7F, TF, GFP, AAG, ALT, BFL, TTL, TL, EFL, V1, V2, V3, V4, V5, V6, V7, V4+V5+V6+V7, (T5+G56)/G45, (T5+G56)/G67, (T3+G34+T4)/G45, (T3+G34+T4)/G67, EFL/T1, EFL/AAG, TTL/AAG, BFL/(G12+T2+G34+G56), ALT/G23, TL/(G12+T2+G34+G56), TL/(T1+G12+T2), TTL/(T1+G12+T2), ALT/BFL, T7/T6, TL/(T6+G67+T7), ALT/AAG, TTL/(G23+G45), (G23+T6+T7)/(T1+G67) of this embodiment may be referred to FIGS. 38A and 38B.

Figure 10:
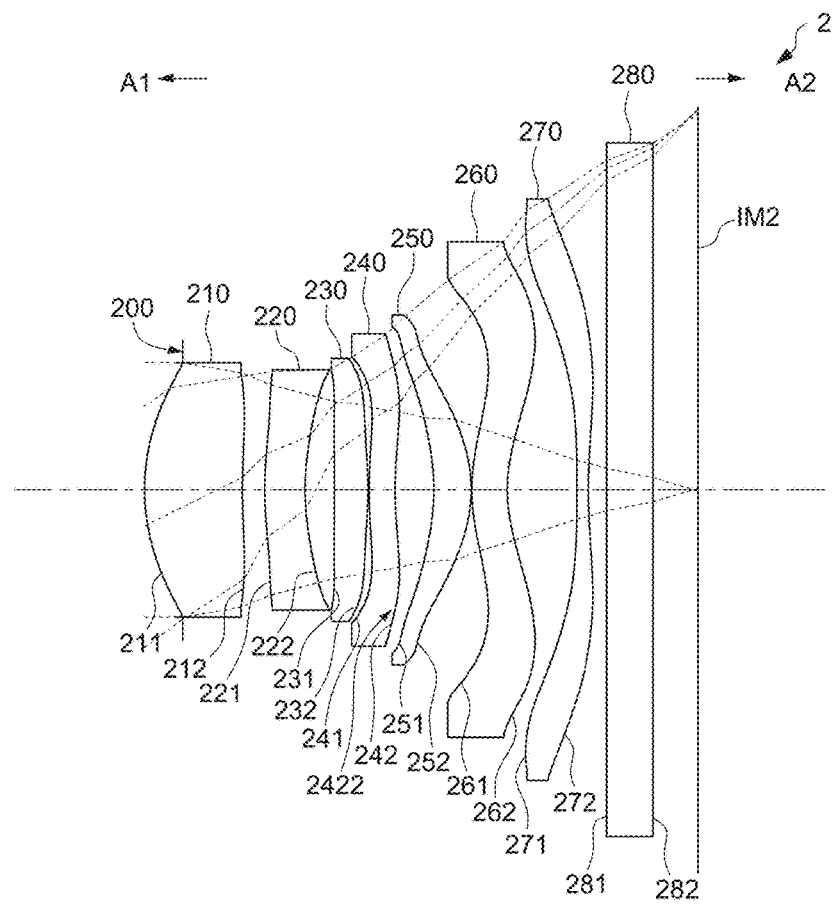
FIG. 10 depicts a cross-sectional view of a second embodiment of an optical imaging lens having eight lens elements according to the present disclosure.
Figure 11:
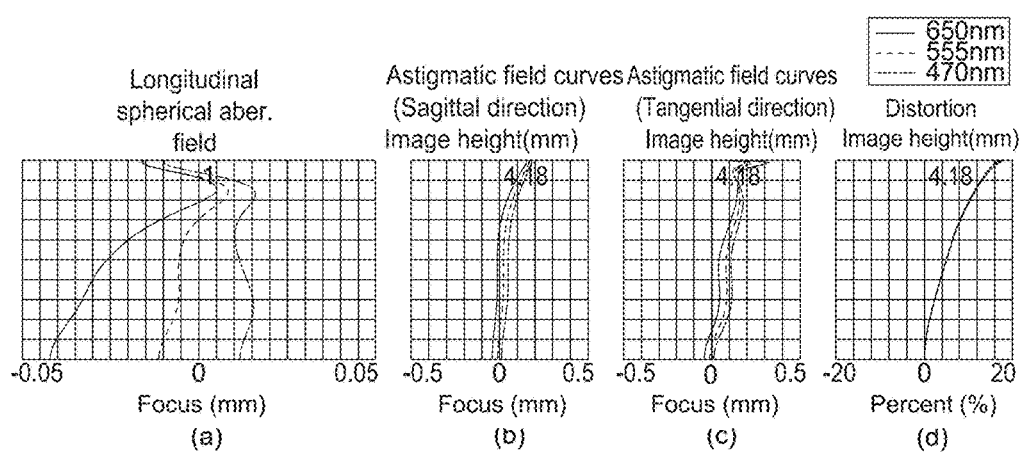
FIG. 11 depicts a chart of longitudinal spherical aberration and other kinds of optical aberrations of a second embodiment of an optical imaging lens according to one embodiment of the present disclosure.

Reference is now made to FIGS. 10-13. FIG. 10 illustrates an example cross-sectional view of an optical imaging lens 2 having seven lens elements according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment may be similar to those in the first embodiment for the similar elements, but here the reference numbers may be initialed with 2; for example, reference number 231 may label the object-side surface of the third lens element 230, reference number 232 may label the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230, a fourth lens element 240, a fifth lens element 250 a sixth lens element 260 and a seventh lens element 270.

The arrangements of convex or concave surface structures including the object-side surfaces 211, 221, 231, 241, 251, 261, 271 and the image-side surfaces 212, 222, 232, 252, 262, 272 may be generally similar to the optical imaging lens 1, but the differences between the optical imaging lens 1 and the optical imaging lens 2 may include the convex or concave surface structures of the image-side surface 242. Additional differences may include a radius of curvature, a thickness, an aspherical data, and an effective focal length of each lens element. More specifically, the image-side surface 242 of the fourth lens element 240 may comprise a convex portion 2422 in a vicinity of a periphery of the fourth lens element 240.

Here, in the interest of clearly showing the drawings of a particular embodiment, only the surface shapes which are different from that in the first embodiment may be labeled. Please refer to FIG. 12 for the optical characteristics of each lens element in the optical imaging lens 2 of the present embodiment.

From the vertical deviation of each curve shown in FIG. 11(a), the offset of the off-axis light relative to the image point may be within about ±0.045 mm. Referring to FIG. 11(b), the focus variation with respect to the three different wavelengths (470 nm, 555 nm, 650 nm) in the whole field may fall within about ±0.2 mm. Referring to FIG. 11(c), the focus variation with respect to the three different wavelengths (470 nm, 555 nm, 650 nm) in the whole field may fall within about ±0.35 mm. Referring to FIG. 11(d), the variation of the distortion aberration of the optical imaging lens 2 may be within about ±19%.

The values of T1, G12, T2, G23, T3, G34, T4, G45, T5, G56, T6, G67, T7, G7F, TF, GFP, AAG, ALT, BFL, TTL, TL, EFL, V1, V2, V3, V4, V5, V6, V7, V4+V5+V6+V7, (T5+G56)/G45, (T5+G56)/G67, (T3+G34+T4)/G45, (T3+G34+T4)/G67, EFL/T1, EFL/AAG, TTL/AAG, BFL/(G12+T2+G34+G56), ALT/G23, TL/(G12+T2+G34+G56), TL/(T1+G12+T2), TTL/(T1+G12+T2), ALT/BFL, T7/T6, TL/(T6+G67+T7), ALT/AAG, TTL/(G23+G45), (G23+T6+T7)/(T1+G67) of this embodiment may be referred to FIGS. 38A and 38B.

In comparison with the first embodiment, this embodiment may be manufactured more easily, and the yield rate may be higher when compared to the first embodiment.

Figure 14:
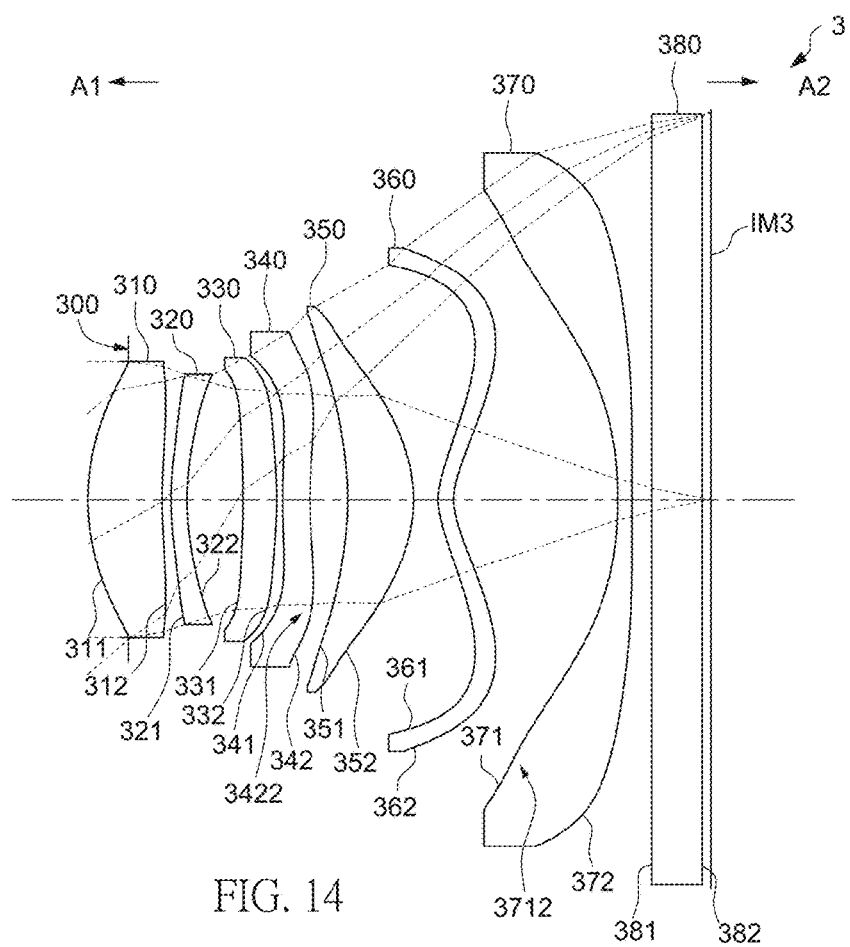
FIG. 14 depicts a cross-sectional view of a third embodiment of an optical imaging lens having eight lens elements according to the present disclosure.
Figure 15:
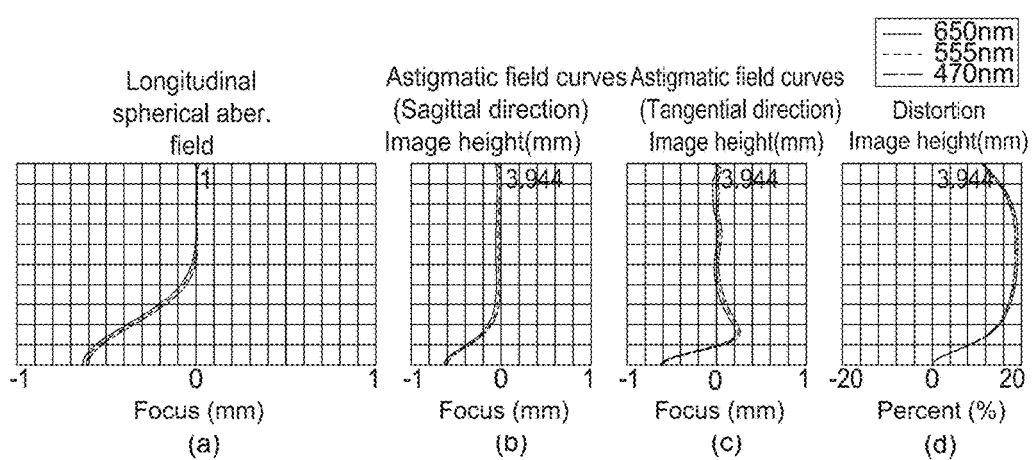
FIG. 15 depicts a chart of longitudinal spherical aberration and other kinds of optical aberrations of a third embodiment of an optical imaging lens according the present disclosure.

Reference is now made to FIGS. 14-17. FIG. 14 illustrates an example cross-sectional view of an optical imaging lens 3 having seven lens elements according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment may be similar to those in the first embodiment for the similar elements, but here the reference numbers may be initialed with 3; for example, reference number 331 may label the object-side surface of the third lens element 330, reference number 332 may label the image-side surface of the third lens element 330, etc.

As shown in FIG. 14, the optical imaging lens 3 of the third example embodiment, in an order from an object side A1 to an image side A2 along an optical axis, may comprise an aperture stop 300, a first lens element 310, a second lens element 320, a third lens element 330, a fourth lens element 340, a fifth lens element 350 a sixth lens element 360 and a seventh lens element 370.

The arrangements of the convex or concave surface structures in the third example embodiment, including the object-side surfaces 311, 321, 331, 351, 361 and the image-side surfaces 312, 322, 332, 352, 362, 372 may be generally similar to the optical imaging lens 1 (FIG. 6 depicting the first example embodiment), but the differences between the optical imaging lens 1 and the optical imaging lens 3 may include the convex or concave surface structures of the object-side surface 371 and the image-side surface 342 and the refracting power of the six lens element 630. Additional differences may include a radius of curvature, a thickness, an aspherical data, and an effective focal length of each lens element. More specifically, the sixth lens element 360 may have positive refracting power, the image-side surface 342 of the fourth lens element 340 may comprise a convex portion 3422 in a vicinity of a periphery of the fourth lens element 340, the image-side surface 371 of the seventh lens element 370 may comprise a concave portion 3712 in a vicinity of a periphery of the seventh lens element 370.

Here, in the interest of clearly showing the drawings of a particular embodiment, only the surface shapes which are different from that in the first embodiment may be labeled. Please refer to FIG. 16 for the optical characteristics of each lens element in the optical imaging lens 3 of the third example embodiment.

From the vertical deviation of each curve shown in FIG. 15(a), the offset of the off-axis light relative to the image point may be within about ±0.7 mm. Referring to FIG. 15(b), the focus variation with respect to the three different wavelengths (470 nm, 555 nm, 650 nm) in the whole field may fall within about ±0.7 mm. Referring to FIG. 15(c), the focus variation with respect to the three different wavelengths (470 nm, 555 nm, 650 nm) in the whole field may fall within about ±0.7 mm. Referring to FIG. 15(d), the variation of the distortion aberration of the optical imaging lens 3 may be within about ±20%.

The values of T1, G12, T2, G23, T3, G34, T4, G45, T5, G56, T6, G67, T7, G7F, TF, GFP, AAG, ALT, BFL, TTL, TL, EFL, V1, V2, V3, V4, V5, V6, V7, V4+V5+V6+V7, (T5+G56)/G45, (T5+G56)/G67, (T3+G34+T4)/G45, (T3+G34+T4)/G67, EFL/T1, EFL/AAG, TTL/AAG, BFL/(G12+T2+G34+G56), ALT/G23, TL/(G12+T2+G34+G56), TL/(T1+G12+T2), TTL/(T1+G12+T2), ALT/BFL, T7/T6, TL/(T6+G67+T7), ALT/AAG, TTL/(G23+G45), (G23+T6+T7)/(T1+G67) of this embodiment may be referred to FIGS. 38A and 38B.

In comparison with the first embodiment, this embodiment has a smaller value of Fno and a larger value of HFOV. Moreover, this embodiment may be manufactured more easily, and the yield rate may be higher when compared to the first embodiment.

Figure 18:
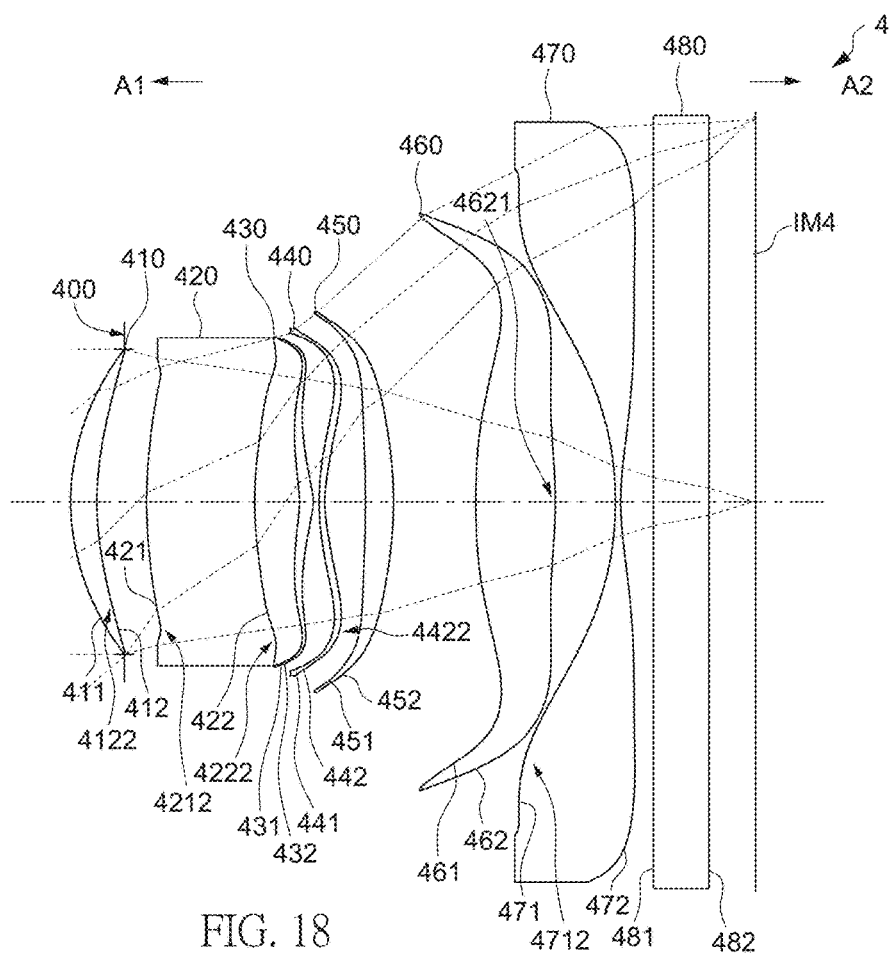
FIG. 18 depicts a cross-sectional view of a fourth embodiment of an optical imaging lens having eight lens elements according to the present disclosure.
Figure 19:
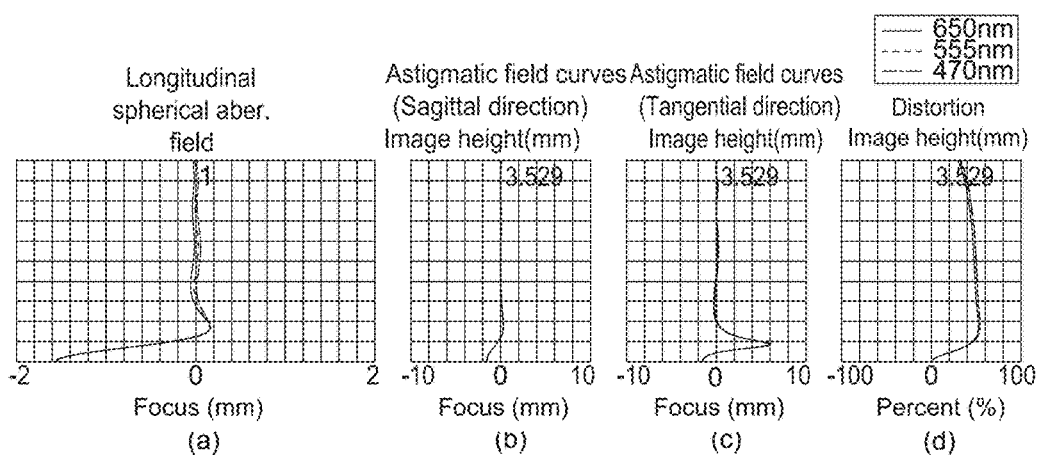
FIG. 19 depicts a chart of longitudinal spherical aberration and other kinds of optical aberrations of a fourth embodiment of an optical imaging lens according the present disclosure.

Reference is now made to FIGS. 18-21. FIG. 18 illustrates an example cross-sectional view of an optical imaging lens 4 having seven lens elements according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment may be similar to those in the first example embodiment for the similar elements, but here the reference numbers may be initialed with 4; for example, reference number 431 may label the object-side surface of the third lens element 430, reference number 432 may label the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430, a fourth lens element 440, a fifth lens element 450 a sixth lens element 460 and a seventh lens element 470.

The arrangements of the convex or concave surface structures, including the object-side surfaces 411, 431, 441, 451, 461 and the image-side surfaces 432, 452, 472 may be generally similar to the optical imaging lens 1, but the differences between the optical imaging lens 1 and the optical imaging lens 4 may include the convex or concave surface of the object-side surface 471 and image-side surfaces 412, 442, 462 and the refracting powers of the second and sixth lens elements 420 and 460. Additional differences may include a radius of curvature, a thickness, aspherical data, and an effective focal length of each lens element. More specifically, the second lens element 420 has positive refracting power, the sixth lens element 460 has positive refracting power, the image-side surface 412 of the first lens element 410 may comprise a concave portion 4122 in a vicinity of a periphery of the first lens element 410, the object-side surface 421 of the second lens element 420 may comprise a concave portion 4212 in a vicinity of a periphery of the second lens element 420, the image-side surface 422 of the second lens element 420 may comprise a convex portion 4222 in a vicinity of a periphery of the second lens element 420, the image-side surface 442 of the fourth lens element 440 may comprise a convex portion 4422 in a vicinity of a periphery of the fourth lens element 440, the image-side surface 462 of the sixth lens element 460 may comprise a convex portion 4621 in a vicinity of the optical axis, the object-side surface 471 of the seventh lens element 470 may comprise a concave portion 4712 in a vicinity of a periphery of the seventh lens element 470.

Here, in the interest of clearly showing the drawings of a particular embodiment, only the surface shapes which are different from that in the first embodiment may be labeled. Please refer to FIG. 20 for the optical characteristics of each lens elements in the optical imaging lens 4 of the present embodiment.

From the vertical deviation of each curve shown in FIG. 19($a$), the offset of the off-axis light relative to the image point may be within about ±1.6 mm. Referring to FIG. 19($b$), the focus variation with respect to the three different wavelengths (470 nm, 555 nm, 650 nm) in the whole field may fall within about ±2 mm. Referring to FIG. 19($c$), the focus variation with respect to the three different wavelengths (470 nm, 555 nm, 650 nm) in the whole field may fall within about ±6 mm. Referring to FIG. 19($d$), the variation of the distortion aberration of the optical imaging lens 4 may be within about ±60%.

The values of T1, G12, T2, G23, T3, G34, T4, G45, T5, G56, T6, G67, T7, G7F, TF, GFP, AAG, ALT, BFL, TTL, TL, EFL, V1, V2, V3, V4, V5, V6, V7, V4+V5+V6+V7, (T5+G56)/G45, (T5+G56)/G67, (T3+G34+T4)/G45, (T3+G34+T4)/G67, EFL/T1, EFL/AAG, TTL/AAG, BFL/(G12+T2+G34+G56), ALT/G23, TL/(G12+T2+G34+G56), TL/(T1+G12+T2), TTL/(T1+G12+T2), ALT/BFL, T7/T6, TL/(T6+G67+T7), ALT/AAG, TTL/(G23+G45), (G23+T6+T7)/(T1+G67) of this embodiment may be referred to FIGS. 38A and 38B.

In comparison with the first embodiment, this embodiment has a smaller value of Fno and a larger value of HFOV. Moreover, this embodiment may be manufactured more easily, and the yield rate may be higher when compared to the first embodiment.

Figure 22:
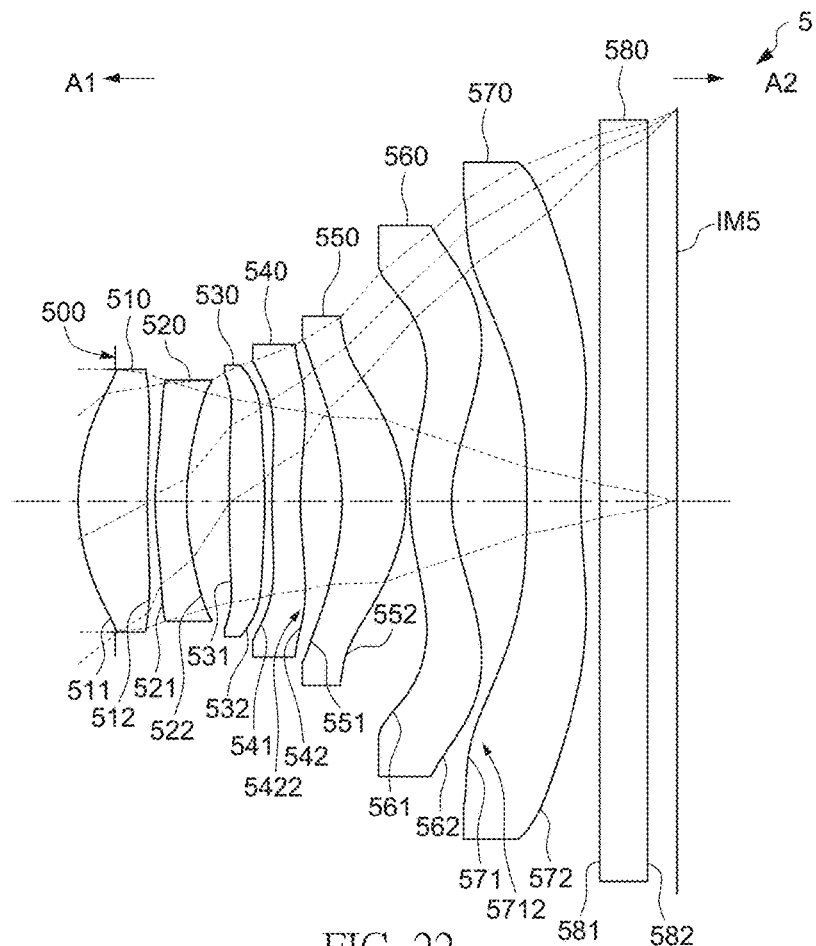
FIG. 22 depicts a cross-sectional view of a fifth embodiment of an optical imaging lens having eight lens elements according to the present disclosure.
Figure 23:
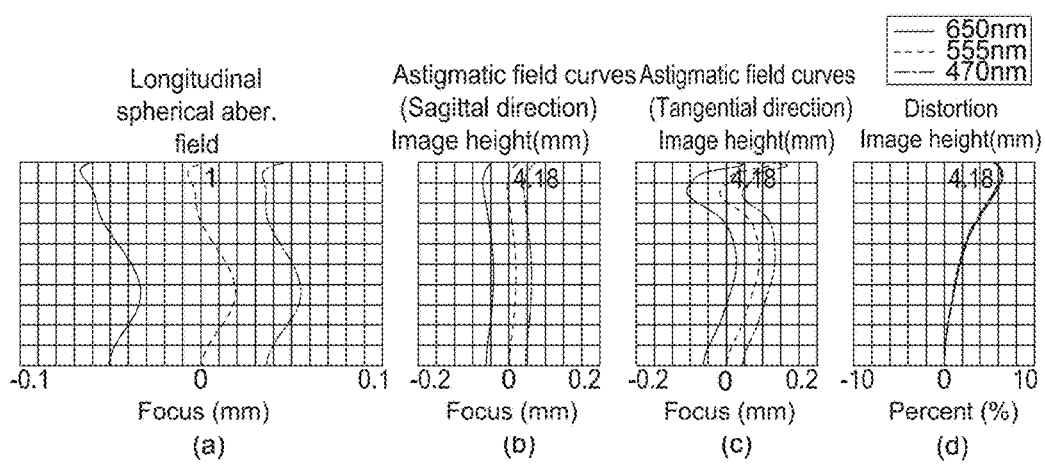
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having seven lens elements according to a fifth example embodiment. FIG. 23 shows example charts of longitudinal spherical aberration and other kinds of optical aberrations of the optical imaging lens 6 according to the fifth embodiment. FIG. 24 shows an example table of optical data of each lens element of the optical imaging lens 5 according to the fifth example embodiment. FIG. 25 shows an example table of aspherical data of the optical imaging lens 6 according to the fifth example embodiment. The reference numbers labeled in the present embodiment may be similar to those in the first embodiment for the similar elements, but here the reference numbers may be initialed with 5; for example, reference number 531 may label the object-side surface of the third lens element 530, reference number 532 may label the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530, a fourth lens element 540, a fifth lens element 550, a sixth lens element 560 and a seventh lens element 570.

The arrangements of the convex or concave surface structures, including the object-side surfaces 511, 521, 531, 541, 551, 561 and the image-side surfaces 512, 522, 532, 552, 562, 572 may be generally similar to the optical imaging lens 1, but the differences between the optical imaging lens 1 and the optical imaging lens 5 may include the convex or concave surface of the object-side surface 571 and the image-side surface 542. Additional differences may include a radius of curvature, a thickness, aspherical data, and an effective focal length of each lens element. More specifically, the image-side surface 542 of the fourth lens element 540 may comprise a convex portion 5422 in a vicinity of a periphery of the fourth lens element 540, the object-side surface 571 of the seventh lens element 570 may comprise a concave portion 5712 in a vicinity of a periphery of the seventh lens element 570.

Here, in the interest of clearly showing the drawings of a particular embodiment, only the surface shapes which are different from that in the first embodiment may be labeled. FIG. 24 depicts the optical characteristics of each lens elements in the optical imaging lens 6 of the present embodiment.

From the vertical deviation of each curve shown in FIG. 23($a$), the offset of the off-axis light relative to the image point may be within about ±0.07 mm. Referring to FIG. 23($b$), the focus variation with respect to the three different wavelengths (470 nm, 555 nm, 650 nm) in the whole field may fall within about ±0.08 mm. Referring to FIG. 23($c$), the focus variation with respect to the three different wavelengths (470 nm, 555 nm, 650 nm) in the whole field may fall within about ±0.14 mm. Referring to FIG. 23($d$), the variation of the distortion aberration of the optical imaging lens 6 may be within about ±7%.

The values of T1, G12, T2, G23, T3, G34, T4, G45, T5, G56, T6, G67, T7, G7F, TF, GFP, AAG, ALT, BFL, TTL, TL, EFL, V1, V2, V3, V4, V5, V6, V7, V4+V5+V6+V7, (T5+G56)/G45, (T5+G56)/G67, (T3+G34+T4)/G45, (T3+G34+T4)/G67, EFL/T1, EFL/AAG, TTL/AAG, BFL/(G12+T2+G34+G56), ALT/G23, TL/(G12+T2+G34+G56), TL/(T1+G12+T2), TTL/(T1+G12+T2), ALT/BFL, T7/T6, TL/(T6+G67+T7), ALT/AAG, TTL/(G23+G45), (G23+T6+T7)/(T1+G67) of this embodiment may be referred to FIGS. 38A and 38B.

In comparison with the first embodiment, this embodiment has a larger value of HFOV. Moreover, this embodiment may be manufactured more easily, and the yield rate may be higher when compared to the first embodiment.

Figure 26:
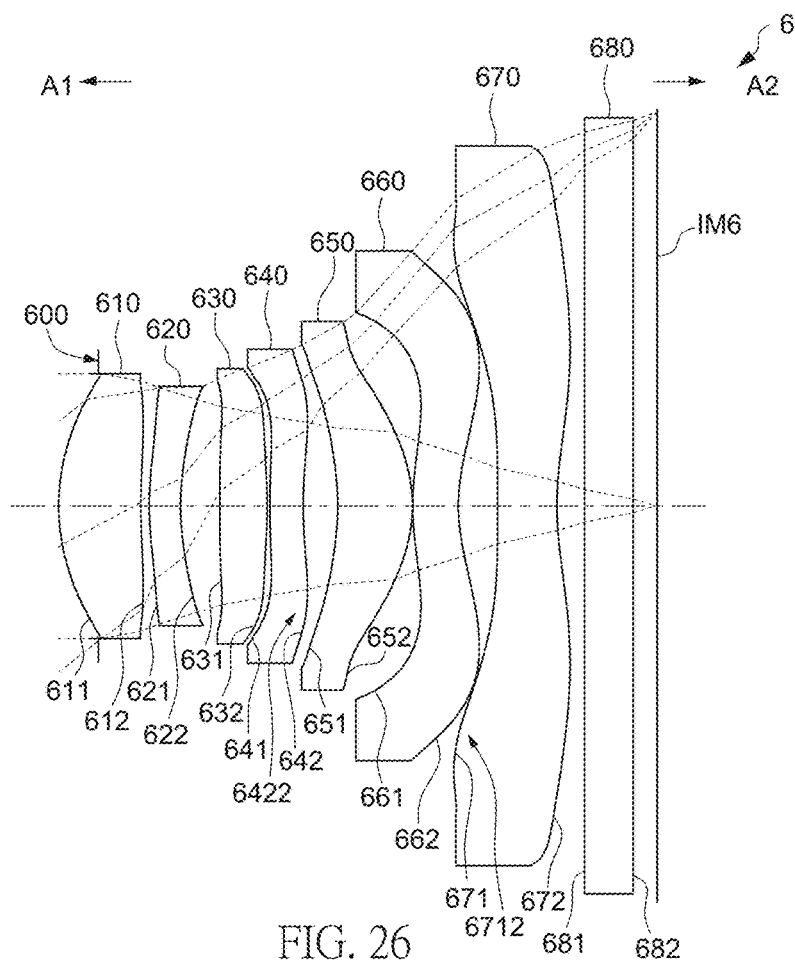
FIG. 26 depicts a cross-sectional view of a sixth embodiment of an optical imaging lens having eight lens elements according to the present disclosure.
Figure 27:
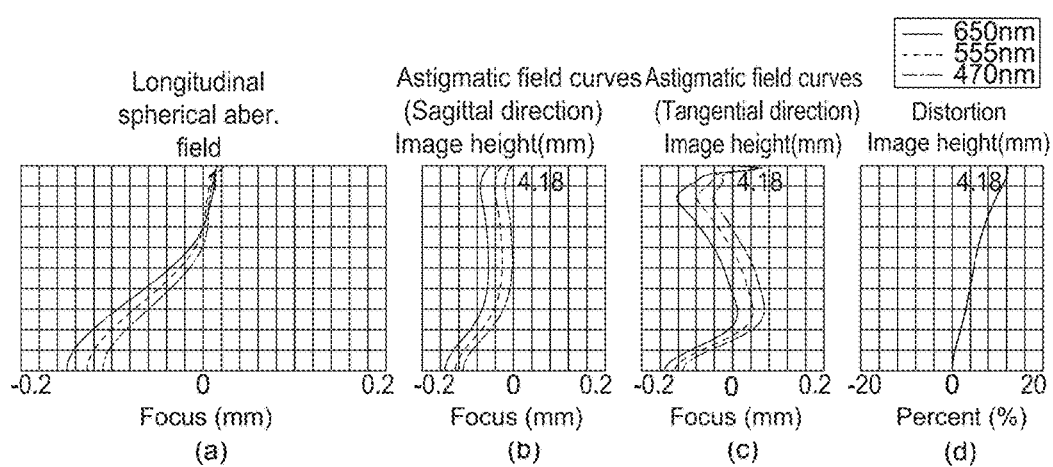
FIG. 27 depicts a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having seven lens elements according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6; for example, reference number 631 may label the object-side surface of the third lens element 630, reference number 632 may label the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, a fifth lens element 650, a sixth lens element 660 and a seventh lens element 670.

The arrangements of the convex or concave surface structures, including the object-side surfaces 611, 621, 631, 641, 651, 661 and the image-side surfaces 612, 622, 632, 652, 662, 672 may be generally similar to the optical imaging lens 1 (FIG. 6 depicting the first example embodiment), but the differences between the optical imaging lens 1 and the optical imaging lens 6 may include the convex or concave surface of the object-side surface 671 and the image-side surface 642. Additional differences may include a radius of curvature, a thickness, aspherical data, and an effective focal length of each lens element. More specifically, the image-side surface 642 of the fourth lens element 640 may comprise a convex portion 6422 in a vicinity of a periphery of the fourth lens element 640, the object-side surface 671 of the seventh lens element 670 may comprise a concave portion 6712 in a vicinity of a periphery of the seventh lens element 670.

Here, in the interest of clearly showing the drawings of a particular embodiment, only the surface shapes which are different from that in the first embodiment may be labeled. Please refer to FIG. 28 for the optical characteristics of each lens elements in the optical imaging lens 6 of the present embodiment.

From the vertical deviation of each curve shown in FIG. 27(a), the offset of the off-axis light relative to the image point may be within about ±0.16 mm. Referring to FIG. 27(b), the focus variation with respect to the three different wavelengths (470 nm, 555 nm, 650 nm) in the whole field may fall within about ±0.16 mm. Referring to FIG. 23(c), the focus variation with respect to the three different wavelengths (470 nm, 555 nm, 650 nm) in the whole field may fall within about ±0.16 mm. Referring to FIG. 27(d), the variation of the distortion aberration of the optical imaging lens 6 may be within about ±14%.

The values of T1, G12, T2, G23, T3, G34, T4, G45, T5, G56, T6, G67, T7, G7F, TF, GFP, AAG, ALT, BFL, TTL, TL, EFL, V1, V2, V3, V4, V5, V6, V7, V4+V5+V6+V7, (T5+G56)/G45, (T5+G56)/G67, (T3+G34+T4)/G45, (T3+G34+T4)/G67, EFL/T1, EFL/AAG, TTL/AAG, BFL/(G12+T2+G34+G56), ALT/G23, TL/(G12+T2+G34+G56), TL/(T1+G12+T2), TTL/(T1+G12+T2), ALT/BFL, T7/T6, TL/(T6+G67+T7), ALT/AAG, TTL/(G23+G45), (G23+T6+T7)/(T1+G67) of this embodiment may be referred to FIGS. 38A and 38B.

In comparison with the first embodiment, this embodiment may have a smaller value of Fno and a larger value of HFOV. Moreover, this embodiment may be manufactured more easily, and the yield rate is higher when compared to the first embodiment.

Figure 30:
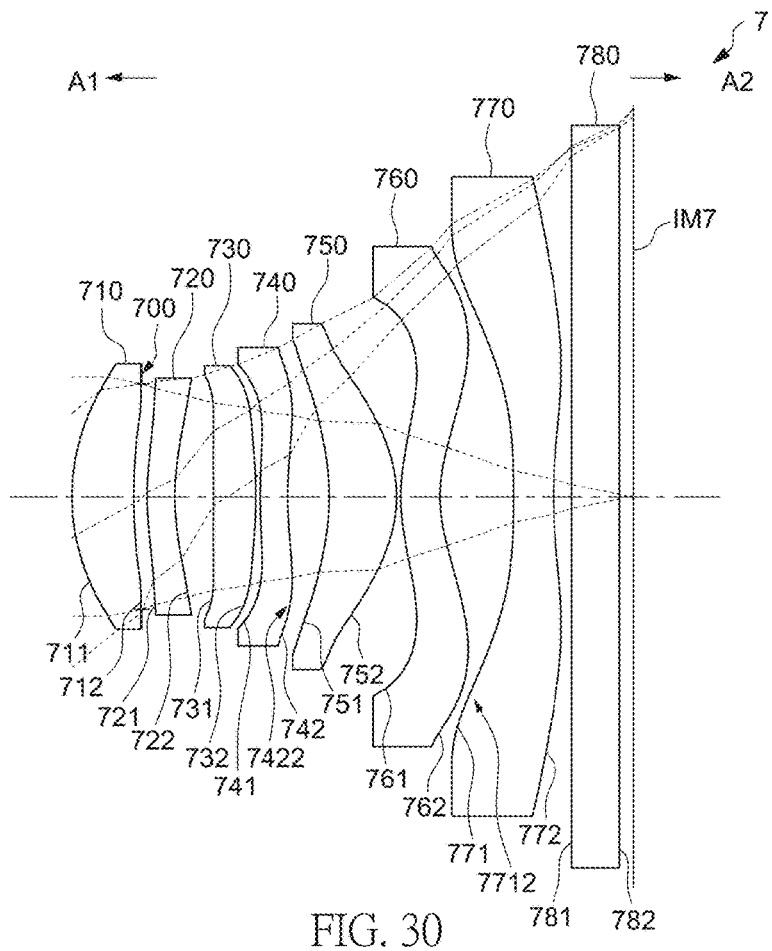
FIG. 30 depicts a cross-sectional view of a seventh embodiment of an optical imaging lens having eight lens elements according to the present disclosure.
Figure 31:
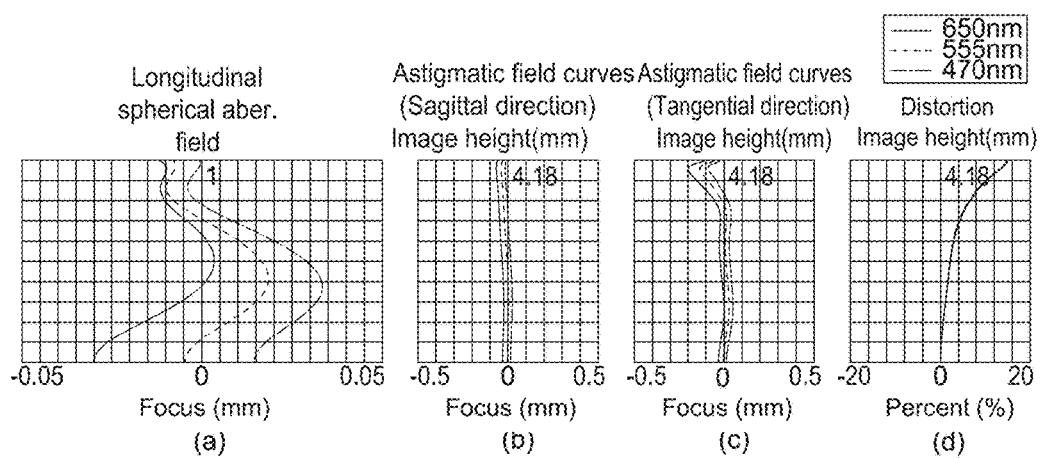
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having seven lens elements according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7; for example, reference number 731 may label the object-side surface of the third lens element 730, reference number 732 may label the image-side surface of the third lens element 730, etc.

As shown in FIG. 30, the optical imaging lens 7 of the present embodiment, in an order from an object side A1 to an image side A2 along an optical axis, may comprise a first lens element 710, an aperture stop 700, a second lens element 720, a third lens element 730, a fourth lens element 740, a fifth lens element 750, a sixth lens element 760 and a seventh lens element 770.

The arrangements of the convex or concave surface structures, including the object-side surfaces 711, 721, 731, 741, 751, 761 and the image-side surfaces 712, 722, 732, 752, 762, 772 may be generally similar to the optical imaging lens 1 (FIG. 6 depicting the first example embodiment), but the differences between the optical imaging lens 1 and the optical imaging lens 7 may include the convex or concave surface structures of the object-side surface 771 and the image-side surface 742 and the position of the aperture stop 700. Additional differences may include a radius of curvature, a thickness, aspherical data, and an effective focal length of each lens element. More specifically, the aperture stop 700 is mounted between the first lens element 710 and the second lens element 720, the image-side surface 742 of the fourth lens element 740 may comprise a convex portion 7422 in a vicinity of a periphery of the fourth lens element 740, the object-side surface 771 of the seventh lens element 770 may comprise a concave portion 7712 in a vicinity of a periphery of the seventh lens element 770.

Here, in the interest of clearly showing the drawings of a particular embodiment, only the surface shapes which are different from that in the first embodiment may be labeled.

Please refer to FIG. 32 for the optical characteristics of each lens elements in the optical imaging lens 7 of the present embodiment.

From the vertical deviation of each curve shown in FIG. 31(a), the offset of the off-axis light relative to the image point may be within about ±0.035 mm. Referring to FIG. 31(b), the focus variation with respect to the three different wavelengths (470 nm, 555 nm, 650 nm) in the whole field may fall within about ±0.07 mm. Referring to FIG. 31(c), the focus variation with respect to the three different wavelengths (470 nm, 555 nm, 650 nm) in the whole field may fall within about ±0.2 mm. Referring to FIG. 31(d), the variation of the distortion aberration of the optical imaging lens 7 may be within about ±16%.

The values of T1, G12, T2, G23, T3, G34, T4, G45, T5, G56, T6, G67, T7, G7F, TF, GFP, AAG, ALT, BFL, TTL, TL, EFL, V1, V2, V3, V4, V5, V6, V7, V4+V5+V6+V7, (T5+G56)/G45, (T5+G56)/G67, (T3+G34+T4)/G45, (T3+G34+T4)/G67, EFL/T1, EFL/AAG, TTL/AAG, BFL/(G12+T2+G34+G56), ALT/G23, TL/(G12+T2+G34+G56), TL/(T1+G12+T2), TTL/(T1+G12+T2), ALT/BFL, T7/T6, TL/(T6+G67+T7), ALT/AAG, TTL/(G23+G45), (G23+T6+T7)/(T1+G67) of this embodiment may be referred to FIGS. 38A and 38B.

In comparison with the first embodiment, this embodiment may have a shorter value of TTL and a larger value of HFOV. Moreover, this embodiment may be manufactured more easily, and the yield rate is higher when compared to the first embodiment.

Figure 34:
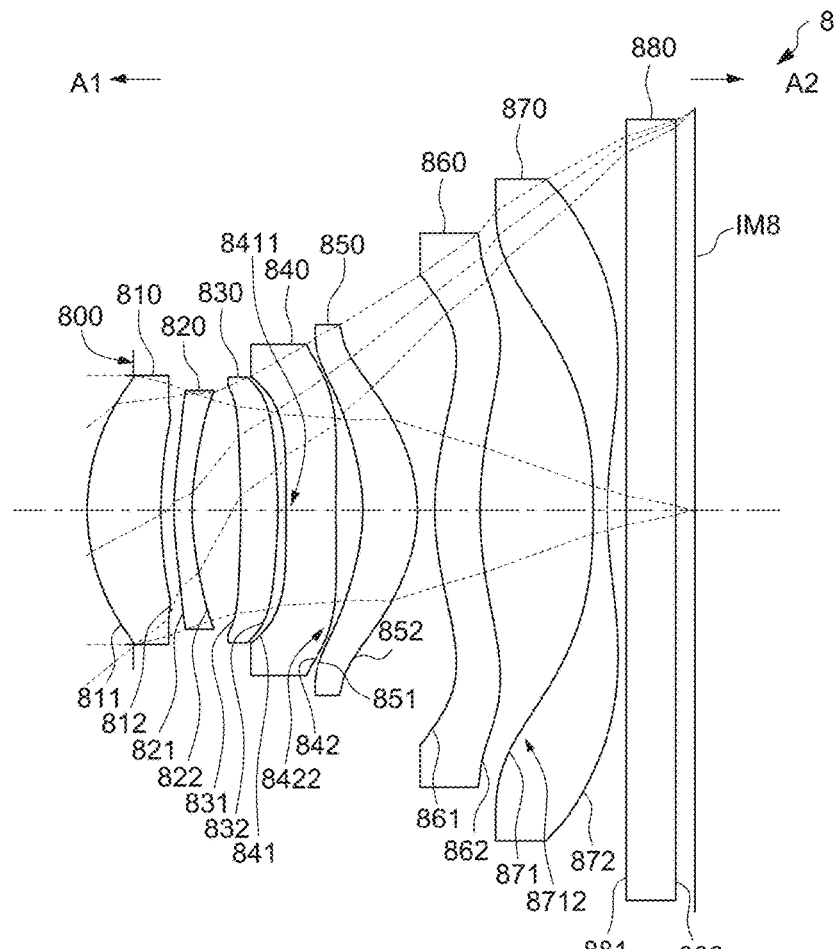
FIG. 34 depicts a cross-sectional view of an eighth embodiment of an optical imaging lens having eight lens elements according to the present disclosure.
Figure 35:
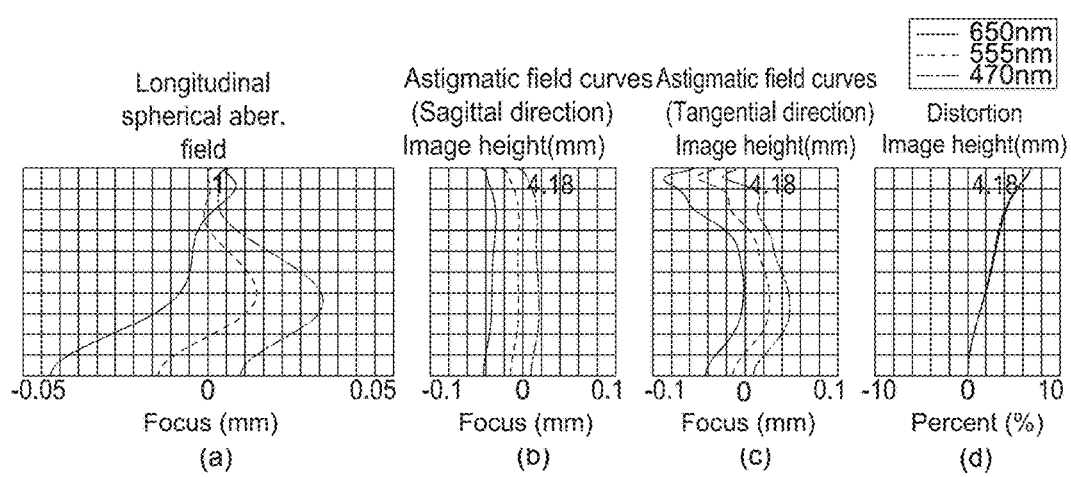
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having seven lens elements according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8; for example, reference number 831 may label the object-side surface of the third lens element 830, reference number 832 may label the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, a fifth lens element 850, a sixth lens element 860 and a seventh lens element 870.

The arrangements of the convex or concave surface structures, including the object-side surfaces 811, 821, 831, 851, 861 and the image-side surfaces 812, 822, 832, 852, 862, 872 may be generally similar to the optical imaging lens 1 (FIG. 6 depicting the first example embodiment), but the differences between the optical imaging lens 1 and the optical imaging lens 8 may include the convex or concave surface structures of the object-side surfaces 841, 871 and the image-side surface 842 and the refracting power of the sixth lens element 860. Additional differences may include a radius of curvature, a thickness, aspherical data, and an effective focal length of each lens element. More specifically, the sixth lens element 860 may have positive refracting power, the object-side surface 841 of the fourth lens element 840 may comprise a concave portion 8411 in a vicinity of the optical axis, the image-side surface 842 of the fourth lens element 840 may comprise a convex portion 8422 in a vicinity of a periphery of the fourth lens element 840, the object-side surface 871 of the seventh lens element 870 may comprise a concave portion 8712 in a vicinity of a periphery of the seventh lens element 870.

Here, in the interest of clearly showing the drawings of a particular embodiment, only the surface shapes which are different from that in the first embodiment may be labeled. Please refer to FIG. 36 for the optical characteristics of each lens elements in the optical imaging lens 8 of the present embodiment.

From the vertical deviation of each curve shown in FIG. 35(a), the offset of the off-axis light relative to the image point may be within about ±0.045 mm. Referring to FIG. 35(b), the focus variation with respect to the three different wavelengths (470 nm, 555 nm, 650 nm) in the whole field may fall within about ±0.05 mm. Referring to FIG. 35(c), the focus variation with respect to the three different wavelengths (470 nm, 555 nm, 650 nm) in the whole field may fall within about ±0.1 mm. Referring to FIG. 35(d), the variation of the distortion aberration of the optical imaging lens 8 may be within about ±7%.

The values of T1, G12, T2, G23, T3, G34, T4, G45, T5, G56, T6, G67, T7, G7F, TF, GFP, AAG, ALT, BFL, TTL, TL, EFL, V1, V2, V3, V4, V5, V6, V7, V4+V5+V6+V7, (T5+G56)/G45, (T5+G56)/G67, (T3+G34+T4)/G45, (T3+G34+T4)/G67, EFL/T1, EFL/AAG, TTL/AAG, BFL/(G12+T2+G34+G56), ALT/G23, TL/(G12+T2+G34+G56), TL/(T1+G12+T2), TTL/(T1+G12+T2), ALT/BFL, T7/T6, TL/(T6+G67+T7), ALT/AAG, TTL/(G23+G45), (G23+T6+T7)/(T1+G67) of this embodiment may be referred to FIGS. 38A and 38B.

In comparison with the first embodiment, this embodiment may have a smaller value of Fno and a larger value of HFOV. Moreover, this embodiment may be manufactured more easily, and the yield rate may be higher when compared to the first embodiment.

The values of T1, G12, T2, G23, T3, G34, T4, G45, T5, G56, T6, G67, T7, G7F, TF, GFP, AAG, ALT, BFL, TTL, TL, EFL, V1, V2, V3, V4, V5, V6, V7, V4+V5+V6+V7, (T5+G56)/G45, (T5+G56)/G67, (T3+G34+T4)/G45, (T3+G34+T4)/G67, EFL/T1, EFL/AAG, TTL/AAG, BFL/(G12+T2+G34+G56), ALT/G23, TL/(G12+T2+G34+G56), TL/(T1+G12+T2), TTL/(T1+G12+T2), ALT/BFL, T7/T6, TL/(T6+G67+T7), ALT/AAG, TTL/(G23+G45), (G23+T6+T7)/(T1+G67) of all embodiment may be referred to in FIGS. 38A and 38B, and it is clear that the optical imaging lens of any one of the eight embodiments may satisfy at least one of the inequalities (1) to (19).

Combinations of the optical parameters disclosed in the various embodiments of the present disclosure may be represented ranges of values defined by minimum and maximum values of each term. As such, values within the ranges of maximum and/or minimum values of each term may be contemplated and/or otherwise utilized herein.

The present optical imaging lens may have a larger value of HFOV, a larger size of the aperture stop, a shorter length, better definition and good imaging quality via the arrangements of the concave or convex surface structures as follow: the object-side surface of the third lens element having a concave portion in a vicinity of the optical axis is beneficial to revise the aberrations caused by the first and second lens elements; the arrangements of the fifth lens element having positive refracting power, the object-side surface of the fifth lens element having a concave portion in a vicinity of the optical axis, the object-side surface of the sixth lens element having a convex portion in a vicinity of the optical axis, and the image-side surface of the seventh lens element having a concave portion in a vicinity of the optical axis may be beneficial to revise the whole aberrations; optionally, the object-side surface of the seventh lens element having a concave portion in a vicinity of the optical axis or satisfying the inequality: $V4+V5+V6+V7 \geq 180.000$ may efficiently decrease aberrations and increase imaging quality. Moreover, a preferred range of $V4+V5+V6+V7$ is "$180.000 \leq V4+V5+V6+V7 \leq 250.000$".

The thickness of one lens element and a distance between two lens elements should be appropriately decreased for shortening the length of the optical imaging lens. However, the thickness of one lens element or a distance between two lens elements should be matched with specific ratios of optical parameters when the degree of difficulty for assembling the optical imaging lens should be considered and imaging quality should be maintained. Therefore, a preferred arrangements of the optical imaging lens can be achieved when the optical imaging lens satisfies any one of inequalities as follow:

$(T5+G56)/G45 \leq 2.700$, and a preferred range of $(T5+G56)/G45$ is "$0.800 \leq (T5+G56)/G45 \leq 2.700$";

$(T5+G56)/G67 \leq 1.900$, a preferred range of $(T5+G56)/G67$ is $0.400 \leq (T5+G56)/G67 \leq 1.900$;

$(T3+G34+T4)/G45 \leq 3.600$, a preferred range of $(T3+G34+T4)/G45$ is "$0.500 \leq (T3+G34+T4)/G45 \leq 3.600$";

$(T3+G34+T4)/G67 \leq 2.700$, a preferred range of $(T3+G34+T4)/G67$ is "$0.300 \leq (T3+G34+T4)/G67 \leq 2.700$";

$BFL/(G12+T2+G34+G56 \leq 3.000$, a preferred range of $BFL/(G12+T2+G34+G56)$ is "$0.400 \leq BFL/(G12+T2+G34+G56) \leq 3.000$";

$ALT/G23 \leq 9.500$, a preferred range of $ALT/G23$ is "$4.000 \leq ALT/G23 \leq 9.500$";

$ALT/BFL \leq 3.800$, a preferred range of $ALT/BFL$ is "$1.800 \leq ALT/BFL \leq 3.800$";

$T7/T6 \leq 1.300$, a preferred range of $T7/T6$ is "$0.050 \leq T7/T6 \leq 1.300$";

$ALT/AAG \leq 3.100$, a preferred range of $ALT/AAG$ is "$0.700 \leq ALT/AAG \leq 3.100$"; and $(G23+T6+T7)/(T1+G67) \leq 1.500$, a preferred range of $(G23+T6+T7)/(T1+G67)$ is "$0.200 \leq (G23+T6+T7)/(T1+G67) \leq 1.500$".

The appropriate ratio of an optical parameter and TTL is maintained to prevent from too small ratio which is disadvantageous to the manufacture of the optical imaging lens or too large ratio which makes the length of the optical imaging lens too long, Therefore, a preferred arrangements of the optical imaging lens can be achieved when the optical imaging lens satisfies any one of inequalities as follow:

$TTL/AAG \leq 4.900$, a preferred range of $TTL/AAG$ is "$1.800 \leq TTL/AAG \leq 4.900$";

$TL/(G12+T2+G34+G56) \leq 11.800$, a preferred range of $TL/(G12+T2+G34+G56)$ is "$2.000 \leq TL/(G12+T2+G34+G56) \leq 11.800$";

$TL/(T1+G12+T2) \leq 5.500$, a preferred range of $TL/(T1+G12+T2)$ is "$2.500 \leq TL/(T1+G12+T2) \leq 5.500$";

$TTL/(T1+G12+T2) \leq 6.800$, a preferred range of $TTL/(T1+G12+T2)$ is "$3.100 \leq TTL/(T1+G12+T2) \leq 6.800$";

$TL/(T6+G67+T7) \leq 3.900$, a preferred range of $TL/(T6+G67+T7)$ is "$2.600 \leq TL/(T6+G67+T7) \leq 3.900$"; and $TTL/(G23+G45) \leq 8.100$, a preferred range of $TTL/(G23+G45)$ is "$5.700 \leq TTL/(G23+G45) \leq 8.100$".

The small value of EFL is often designed because the small value of EFL is advantageous to increase the field of view. Therefore, the field of view can be increased in a thin optical imaging lens when the optical imaging lens satisfies any one of inequalities as follow:

$FL/T1 \leq 7.700$, a preferred range of $EFL/T1$ is "$4.200 \leq EFL/T1 \leq 7.700$"; and $EFL/AAG \leq 3.400$, a preferred range of $EFL/AAG$ is "$0.600 \leq EFL/AAG \leq 3.400$".

According to the present disclosure, the longitudinal spherical aberration, the astigmatism aberration, and the variation of the distortion aberration of each embodiment may meet the use requirements of various electronic products which implement an optical imaging lens. Moreover, the off-axis light with respect to 470 nm, 555 nm and 650 nm wavelengths may be focused around an image point, and the offset of the off-axis light for each curve relative to the image point may be controlled to effectively inhibit the longitudinal spherical aberration, the astigmatism aberration, and the variation of the distortion aberration. Further, as shown by the imaging quality data provided for each embodiment, the distance between the 470 nm, 555 nm and 650 nm wavelengths may indicate that focusing ability and inhibiting ability for dispersion is provided for different wavelengths.

In consideration of the non-predictability of the optical lens assembly, while the optical lens assembly may satisfy any one of inequalities described above, the optical lens assembly herein perfectly may achieve a shorten length, provide an enlarged aperture stop, increase an imaging quality and/or assembly yield, and/or effectively improve drawbacks of a typical optical lens assembly.

Any one of the aforementioned inequalities may be selectively incorporated in other inequalities to apply to the present embodiments, and as such are not limiting. Embodiments according to the present disclosure are not limiting and may be selectively incorporated in other embodiments described herein. In some embodiments, more details about the parameters may be incorporated to enhance the control for the system performance and/or resolution. For example, the object-side surface of the first lens element may comprise a convex portion in a vicinity of the optical axis. It is noted that the details listed here may be incorporated into example embodiments if no inconsistency occurs.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising a first element, a second element, a third element, a fourth element, a fifth lens element, a sixth lens element and a seventh lens element sequentially from an object side to an image side along an optical axis, each of the first, second, third, fourth, fifth, sixth and seventh lens elements having refracting power, an object-side surface facing toward the object side and allowing an imaging ray to pass therethrough and an image-side surface facing toward the image side and allowing the imaging ray to pass therethrough, wherein:

the optical imaging lens comprises no other lenses having refracting power beyond the seven lens elements;

the object-side surface of the third lens element comprises a concave portion in a vicinity of the optical axis;

the fifth lens element has positive refracting power, and the object-side surface of the fifth lens element comprises a concave portion in a vicinity of the optical axis;

the object-side surface of the sixth lens element comprises a convex portion in a vicinity of the optical axis;

the object-side surface of the seventh lens element comprises a concave portion in a vicinity of the optical axis; and the image-side surface of the seventh lens element comprises a concave portion in a vicinity of the optical axis.

2. The optical imaging lens according to claim 1, wherein a thickness of the fifth lens element along the optical axis is represented by T5, a distance from the image-side surface of the fifth lens element to the object-side surface of the sixth lens element along the optical axis is represented by G56, a distance from the image-side surface of the fourth lens element to the object-side surface of the fifth lens element along the optical axis is represented by G45, and T5, G56 and G45 satisfy the inequality:

$(T5+G56)/G45 \leq 2.700$.

3. The optical imaging lens according to claim 1, wherein a thickness of the third lens element along the optical axis is represented by T3, a distance from the image-side surface of the third lens element to the object-side surface of the fourth lens element along the optical axis is represented by G34, a thickness of the fourth lens element along the optical axis is represented by T4, a distance from the image-side surface of the sixth lens element to the object-side surface of the seventh lens element along the optical axis is represented by G67, and T3, G34, T4 and G67 satisfy the inequality:

$(T3+G34+T4)/G67 \leq 2.700$.

4. The optical imaging lens according to claim 1, wherein a distance from the object-side surface of the first lens element to an image plane along the optical axis is represented by TTL, a thickness of the first lens element along the optical axis is represented by T1, a distance from the image-side surface of the first lens element to the object-side surface of the second lens element along the optical axis is represented by G12, a thickness of the second lens element along the optical axis is represented by T2, and TTL, T1, G12 and T2 satisfy the inequality:

$TTL/(T1+G12+T2) \leq 6.800$.

5. The optical imaging lens according to claim 1, wherein an effective focal length of the optical imaging lens is represented by EFL, a sum of a distance between the image-side surface of the first lens element and the object-side surface of the second lens element along the optical axis, a distance between the image-side surface of the second lens element and the object-side surface of the third lens element along the optical axis, a distance between the image-side surface of the third lens element and the object-side surface of the fourth lens element along the optical axis, a distance between the image-side surface of the fourth lens element and the object-side surface of the fifth lens element along the optical axis, a distance between the image-side surface of the fifth lens element and the object-side surface of the sixth lens element along the optical axis, and a distance between the image-side surface of the sixth lens element and the object-side surface of the seventh lens element along the optical axis is represented by AAG, and EFL and AAG satisfy the inequality:

$EFL/AAG \leq 3.400$.

6. The optical imaging lens according to claim 1, wherein a distance from the object-side surface of the first lens element to the image-side surface of the seventh lens element along the optical axis is represented by TL, a thickness of the first lens element along the optical axis is represented by T1, a distance from the image-side surface of the first lens element to the object-side surface of the second lens element along the optical axis is represented by G12, a thickness of the second lens element along the optical axis is represented by T2, and TL, T1, G12 and T2 satisfy the inequality:

$TL/(T1+G12+T2) \leq 5.500$.

7. The optical imaging lens according to claim 1, wherein a sum of the thicknesses of the first lens element, the second element, the third element, the fourth element, the fifth element, the sixth element, and the seventh lens element along the optical axis is represented by ALT, a distance from the image-side surface of the second lens element to the object-side surface of the third lens element along the optical axis is represented by G23, and ALT and G23 satisfy the inequality:

$ALT/G23 \leq 9.500$.

8. The optical imaging lens according to claim 1, wherein a distance from the object-side surface of the first lens element to an image plane along the optical axis is represented by TTL, a sum of a distance between the image-side surface of the first lens element and the object-side surface of the second lens element along the optical axis, a distance between the image-side surface of the second lens element and the object-side surface of the third lens element along the optical axis, a distance between the image-side surface of the third lens element and the object-side surface of the fourth lens element along the optical axis, a distance between the image-side surface of the fourth lens element and the object-side surface of the fifth lens element along the optical axis, a distance between the image-side surface of the fifth lens element and the object-side surface of the sixth lens element along the optical axis, and a distance between the image-side surface of the sixth lens element and the object-side surface of the seventh lens element along the optical axis is represented by AAG, and TTL and AAG satisfy the inequality:

$TTL/AAG \leq 4.900$.

9. The optical imaging lens according to claim 1, wherein a back focal length of the optical imaging lens, i.e. a distance from the image-side surface of the seventh lens element to an image plane along the optical axis, is represented by BFL, a distance from the image-side surface of the first lens element to the object-side surface of the second lens element along the optical axis is represented by G12, a thickness of the second lens element along the optical axis is represented by T2, a distance from the image-side surface of the third lens element to the object-side surface of the fourth lens element along the optical axis is represented by G34, a distance from the image-side surface of the fifth lens element to the object-side surface of the sixth lens element along the optical axis is represented by G56, and BFL, G12, T2, G34 and G56 satisfy the inequality:

$BFL/(G12+T2+G34+G56) \leq 3.000$.

10. The optical imaging lens according to claim 1, wherein a thickness of the seventh lens element along the optical axis is represented by T7, a thickness of the sixth lens element along the optical axis is represented by T6, and T7 and T6 satisfy the inequality:

$T7/T6 \leq 1.300$.

11. An optical imaging lens, comprising a first element, a second element, a third element, a fourth element, a fifth lens element, a sixth lens element and a seventh lens element sequentially from an object side to an image side along an optical axis, each of the first, second, third, fourth, fifth, sixth and seventh lens elements having refracting power, an object-side surface facing toward the object side and allowing an imaging ray to pass therethrough and an image-side surface facing toward the image side and allowing the imaging ray to pass therethrough, wherein:
   the optical imaging lens comprises no other lenses having refracting power beyond the seven lens elements;
   the object-side surface of the third lens element comprises a concave portion in a vicinity of the optical axis;
   the fifth lens element has positive refracting power, and the object-side surface of the fifth lens element comprises a concave portion in a vicinity of the optical axis;
   the object-side surface of the sixth lens element comprises a convex portion in a vicinity of the optical axis;
   the image-side surface of the seventh lens element comprises a concave portion in a vicinity of the optical axis; and
   an Abbe number of the fourth lens element is represented by V4, an Abbe number of the fifth lens element is represented by V5, an Abbe number of the sixth lens element is represented by V6, an Abbe number of the seventh lens element is represented by V7, and V4, V5, V6 and V7 satisfy the inequality:

$V4+V5+V6+V7 \geq 180.000$.

12. The optical imaging lens according to claim 11, wherein a thickness of the fifth lens element along the optical axis is represented by T5, a distance from the image-side surface of the fifth lens element to the object-side surface of the sixth lens element along the optical axis is represented by G56, a distance from the image-side surface of the sixth lens element to the object-side surface of the seventh lens element along the optical axis is represented by G67, and T5, G56 and G67 satisfy the inequality:

$(T5+G56)/G67 \leq 1.900$.

13. The optical imaging lens according to claim 11, wherein a thickness of the third lens element along the optical axis is represented by T3, a distance from the image-side surface of the third lens element to the object-side surface of the fourth lens element along the optical axis is represented by G34, a thickness of the fourth lens element along the optical axis is represented by T4, a distance from the image-side surface of the fourth lens element to the object-side surface of the fifth lens element along the optical axis is represented by G45, and T3, G34, T4 and G45 satisfy the inequality:

$(T3+G34+T4)/G45 \leq 3.600$.

14. The optical imaging lens according to claim 11, wherein a distance from the object-side surface of the first lens element to an image plane along the optical axis is represented by TTL, a distance from the image-side surface of the second lens element to the object-side surface of the third lens element along the optical axis is represented by G23, a distance from the image-side surface of the fourth lens element to the object-side surface of the fifth lens element along the optical axis is represented by G45, and TTL, G23 and G45 satisfy the inequality:

$TTL/(G23+G45) \leq 8.100$.

15. The optical imaging lens according to claim 11, wherein an effective focal length of the optical imaging lens is represented by EFL, a thickness of the first lens element along the optical axis is represented by T1, and EFL and T1 satisfy the inequality:

$EFL/T1 \leq 7.700$.

16. The optical imaging lens according to claim 11, wherein a distance from the object-side surface of the first lens element to the image-side surface of the seventh lens element along the optical axis is represented by TL, a distance from the image-side surface of the first lens element to the object-side surface of the second lens element along the optical axis is represented by G12, a thickness of the second lens element along the optical axis is represented by T2, a distance from the image-side surface of the third lens element to the object-side surface of the fourth lens element along the optical axis is represented by G34, a distance from the image-side surface of the fifth lens element to the object-side surface of the sixth lens element along the optical axis is represented by G56, and TL, G12, T2, G34 and G56 satisfy the inequality:

$TL/(G12+T2+G34+G56) \leq 11.800$.

17. The optical imaging lens according to claim 11, wherein a sum of the thicknesses of the first lens element, the second element, the third element, the fourth element, the fifth element, the sixth element, and the seventh lens element along the optical axis is represented by ALT, a sum of a distance between the image-side surface of the first lens element and the object-side surface of the second lens element along the optical axis, a distance between the image-side surface of the second lens element and the object-side surface of the third lens element along the optical axis, a distance between the image-side surface of the third lens element and the object-side surface of the fourth lens element along the optical axis, a distance between the image-side surface of the fourth lens element and the object-side surface of the fifth lens element along the optical axis, a distance between the image-side surface of the fifth lens element and the object-side surface of the sixth lens element along the optical axis, and a distance between the image-side surface of the sixth lens element and the object-side surface of the seventh lens element along the optical axis is represented by AAG, and ALT and AAG satisfy the inequality:

$ALT/AAG \leq 3.100$.

18. The optical imaging lens according to claim 11, wherein a sum of the thicknesses of the first lens element, the second element, the third element, the fourth element, the fifth element, the sixth element, and the seventh lens element along the optical axis is represented by ALT, a back focal length of the optical imaging lens, i.e. a distance from the image-side surface of the seventh lens element to an image plane along the optical axis, is represented by BFL, and ALT and BFL satisfy the inequality:

$ALT/BFL \leq 3.800$.

19. The optical imaging lens according to claim 11, wherein a distance from the object-side surface of the first lens element to the image-side surface of the seventh lens element along the optical axis is represented by TL, a distance from the image-side surface of the first lens element to the object-side surface of the second lens element along the optical axis is represented by G12, a thickness of the sixth lens element along the optical axis is represented by T6, a distance from the image-side surface of the sixth lens element to the object-side surface of the seventh lens element along the optical axis is represented by G67, a thickness of the seventh lens element along the optical axis is represented by T7, and TL, T6, G67 and T7 satisfy the inequality:

$TL/(T6+G67+T7) \leq 3.900$.

20. The optical imaging lens according to claim 11, wherein a distance from the image-side surface of the second lens element to the object-side surface of the third lens element along the optical axis is represented by G23, a thickness of the sixth lens element along the optical axis is represented by T6, a thickness of the seventh lens element along the optical axis is represented by T7, a thickness of the first lens element along the optical axis is represented by T1, a distance from the image-side surface of the sixth lens element to the object-side surface of the seventh lens element along the optical axis is represented by G67, and G23, T6, T7, T1 and G67 satisfy the inequality:

$(G23+T6+T7)/(T1+G67) \leq 1.500$.

* * * * *